US 12,021,241 B2

(12) United States Patent
Yoshida et al.

(10) Patent No.: US 12,021,241 B2
(45) Date of Patent: Jun. 25, 2024

(54) ELECTRODE FOR SECONDARY BATTERY, SECONDARY BATTERY USING THE ELECTRODE AND METHOD FOR MANUFACTURING THEREOF

(71) Applicant: NEC CORPORATION, Tokyo (JP)

(72) Inventors: Noboru Yoshida, Tokyo (JP); Makihiro Otohata, Tokyo (JP)

(73) Assignee: NEC CORPORATION, Tokyo (JP)

( * ) Notice: Subject to any disclaimer, the term of this patent is extended or adjusted under 35 U.S.C. 154(b) by 826 days.

(21) Appl. No.: 16/980,235

(22) PCT Filed: Feb. 7, 2019

(86) PCT No.: PCT/JP2019/004457
§ 371 (c)(1),
(2) Date: Sep. 11, 2020

(87) PCT Pub. No.: WO2019/176393
PCT Pub. Date: Sep. 19, 2019

(65) Prior Publication Data
US 2021/0036330 A1 Feb. 4, 2021

(30) Foreign Application Priority Data
Mar. 12, 2018 (JP) .................. 2018-043757

(51) Int. Cl.
*H01M 4/66* (2006.01)
*H01M 4/02* (2006.01)
(Continued)

(52) U.S. Cl.
CPC ......... *H01M 4/661* (2013.01); *H01M 4/0404* (2013.01); *H01M 4/366* (2013.01);
(Continued)

(58) Field of Classification Search
CPC .... H01M 4/661; H01M 4/0404; H01M 4/366; H01M 4/623; H01M 10/0525;
(Continued)

(56) References Cited

U.S. PATENT DOCUMENTS

2014/0023921 A1\* 1/2014 Lee ...................... H01M 4/366
427/126.6

FOREIGN PATENT DOCUMENTS

| CN | 1816922 A | 8/2006 |
|---|---|---|
| CN | 104064705 A | 9/2014 |

(Continued)

OTHER PUBLICATIONS

Japanese Office Action for JP Application No. 2020-505677 mailed on Apr. 5, 2022 with English Translation.
(Continued)

*Primary Examiner* — Daniel S Gatewood
(74) *Attorney, Agent, or Firm* — Sughrue Mion, PLLC

(57) ABSTRACT

One of the objects of the present invention is to provide an electrode having an active material layer and an insulating layer formed on a current collector in which the insulating layer has sufficient adhesion and which can be manufactured without significantly changing the manufacturing process. The electrode comprises a current collector 110, an active material layer 111 formed on at least one surface of the current collector 110, and an insulating layer 112 formed on the surface of the active material layer 111. The active material layer 111 includes an active material and a first binder. The insulating layer 112 includes non-conductive particles and a second binder. An interfacial binder ratio, which is a ratio of amount of a binder existing in an interface region between the active material layer 111 and the insulating layer 112 per unit thickness of the interface region to amount of a binder existing in the active material layer 111
(Continued)

per unit thickness of the active material layer 111, is 85% or more.

15 Claims, 16 Drawing Sheets

(51) Int. Cl.
| | | |
|---|---|---|
| *H01M 4/04* | (2006.01) | |
| *H01M 4/36* | (2006.01) | |
| *H01M 4/62* | (2006.01) | |
| *H01M 10/0525* | (2010.01) | |
| *H01M 50/409* | (2021.01) | |
| *H01M 50/443* | (2021.01) | |

(52) U.S. Cl.
CPC ....... *H01M 4/623* (2013.01); *H01M 10/0525* (2013.01); *H01M 50/409* (2021.01); *H01M 50/443* (2021.01); *H01M 2004/027* (2013.01); *H01M 2004/028* (2013.01)

(58) Field of Classification Search
CPC ............ H01M 50/409; H01M 50/443; H01M 2004/027; H01M 2004/028; H01M 10/4235; H01M 10/0413; H01M 4/13; H01M 4/139; H01M 4/62; H01M 10/052; H01M 10/0585; Y02P 70/50; Y02E 60/10
See application file for complete search history.

(56) References Cited

FOREIGN PATENT DOCUMENTS

| | | | |
|---|---|---|---|
| CN | 104769754 A | | 7/2015 |
| JP | 10-334877 A | | 12/1998 |
| JP | 2002-025620 A | | 1/2002 |
| JP | 2002025620 A | * | 1/2002 |
| JP | 2004-327183 A | | 11/2004 |
| JP | 2010-073339 A | | 4/2010 |
| JP | 2013-161771 A | | 8/2013 |
| JP | 2014-038851 A | | 2/2014 |
| JP | 2016-042467 A | | 3/2016 |
| WO | 2015/198519 A1 | | 12/2015 |
| WO | 2017/204077 A1 | | 11/2017 |

OTHER PUBLICATIONS

Chinese Office Action for CN Application No. 201980018703.8 mailed on Dec. 1, 2022 with English Translation.
International Search Report for PCT/JP2019/004457 dated, Apr. 23, 2019 (PCT/ISA/210).

* cited by examiner

[Fig. 1]
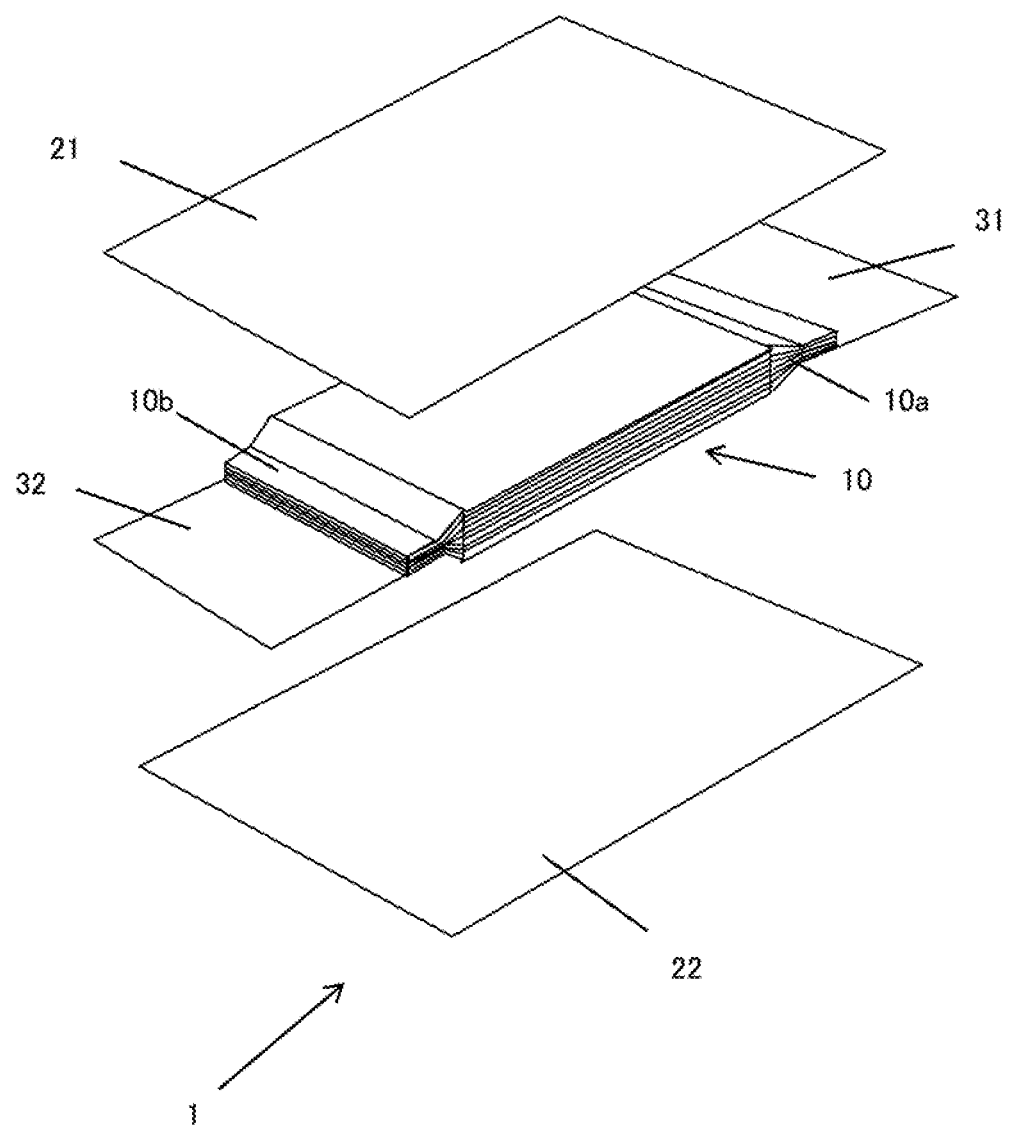

[Fig. 2]
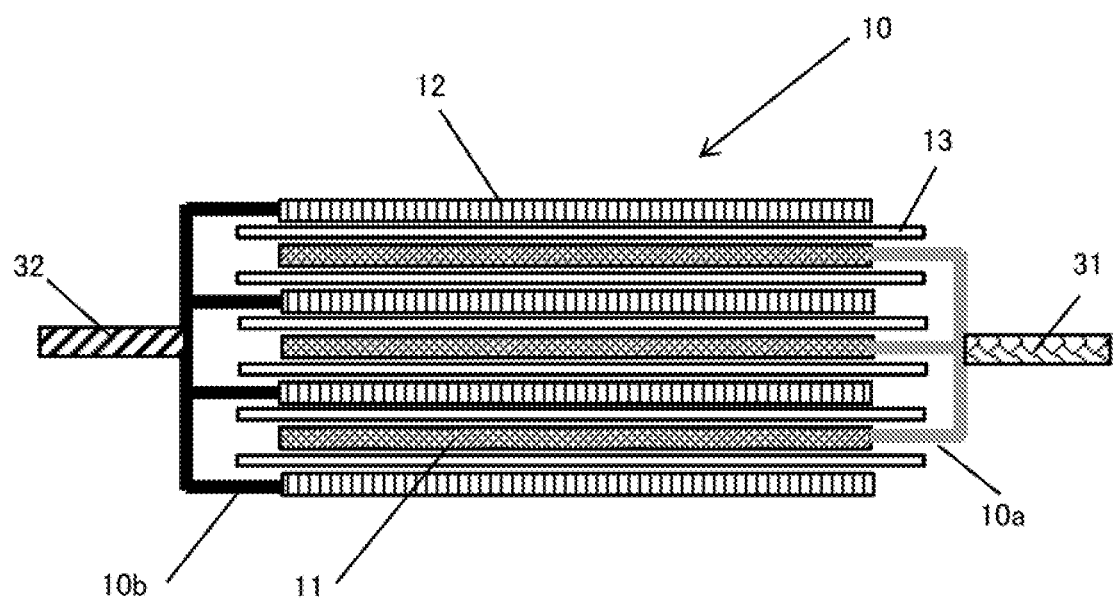

[Fig. 3]
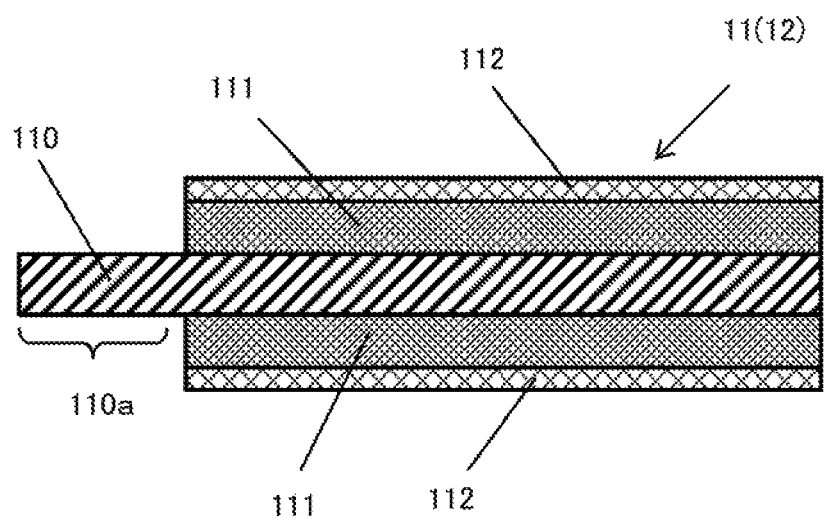

[Fig. 4A]
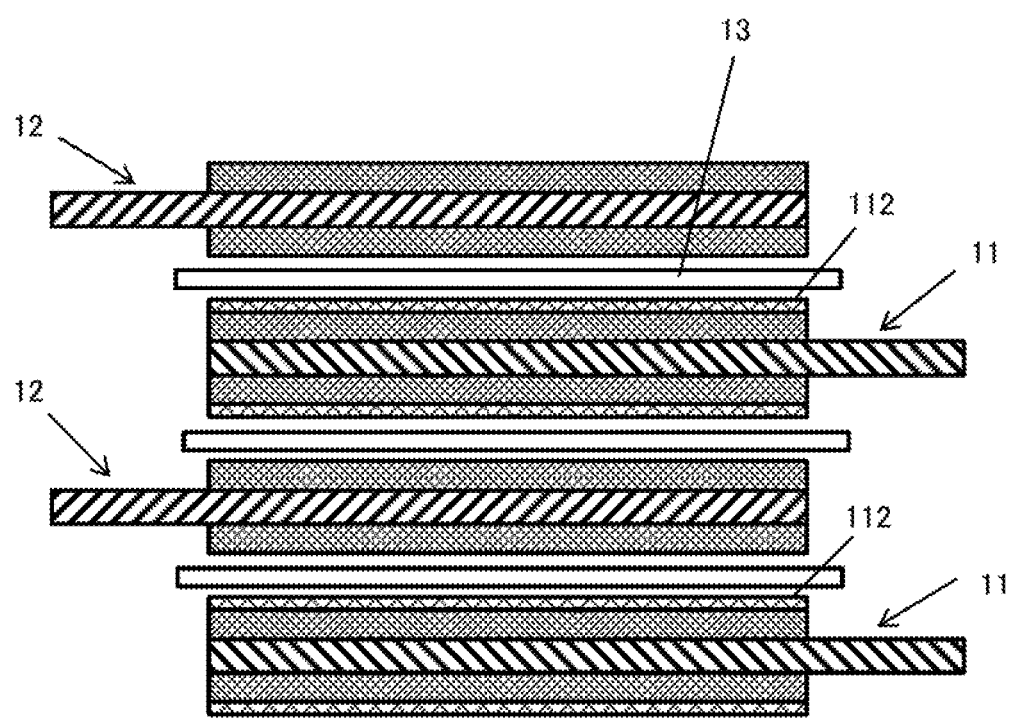

[Fig. 4B]
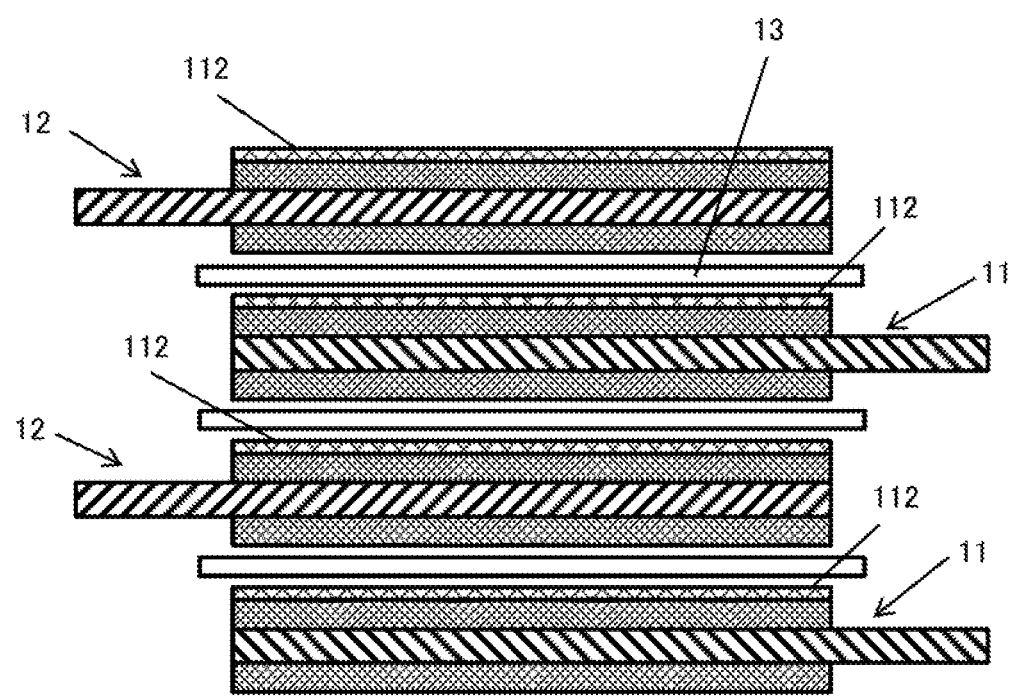

[Fig. 4C]
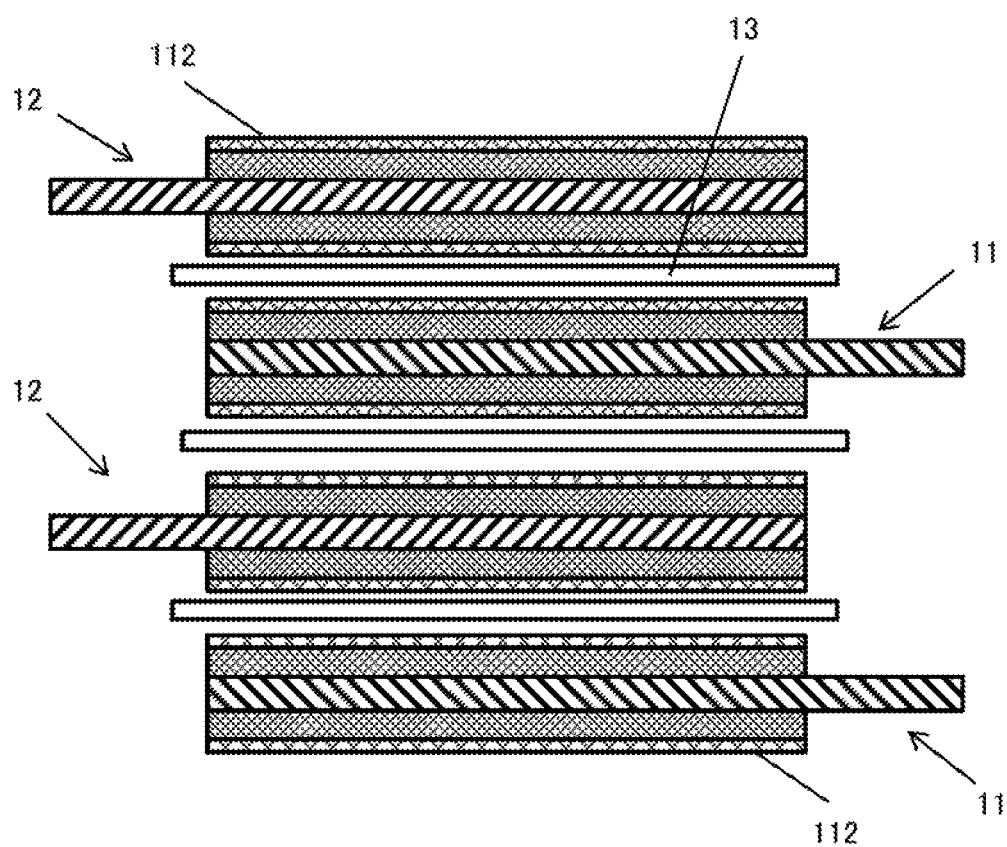

[Fig. 5]
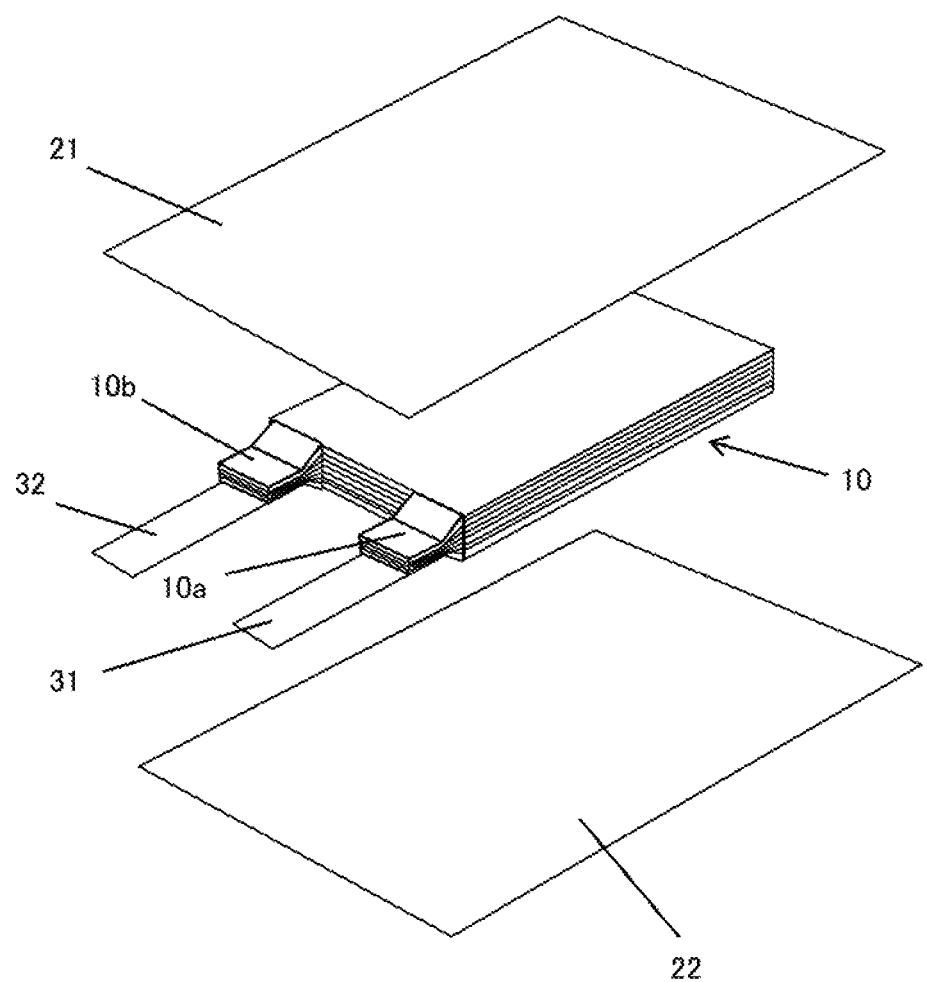

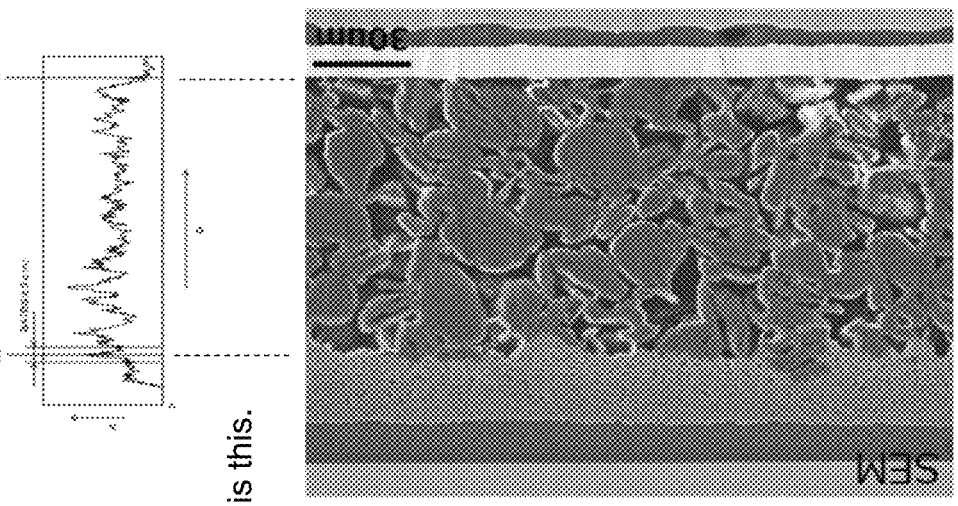
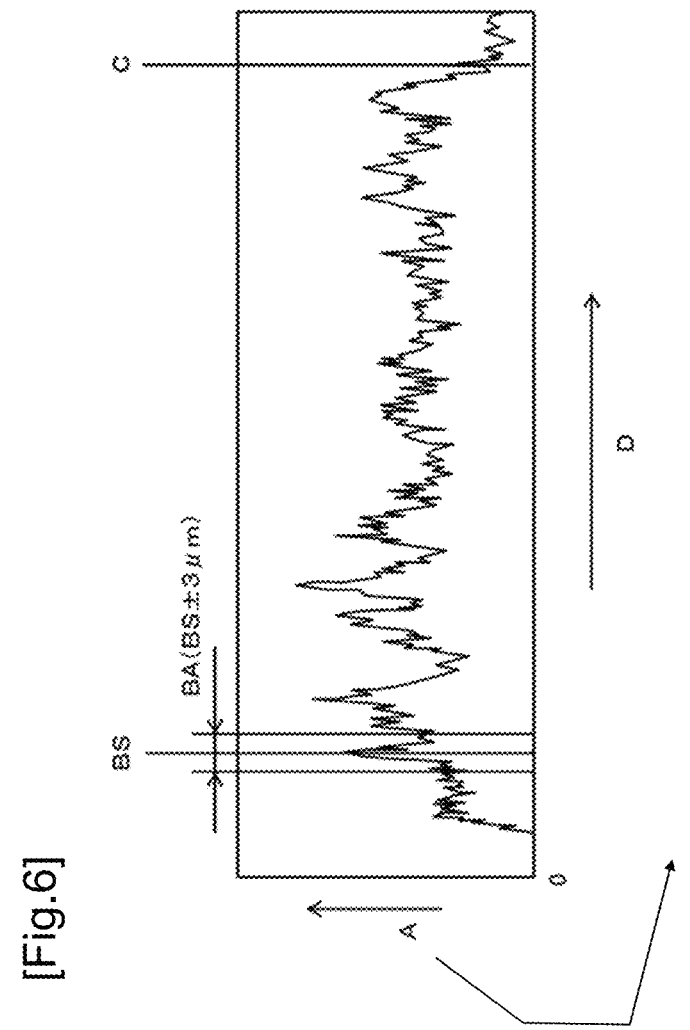
[Fig.6]
"A" is intensity of characteristic X-rays emitted from each element contained in the binder.[0106] (ex. fluorine [0165])

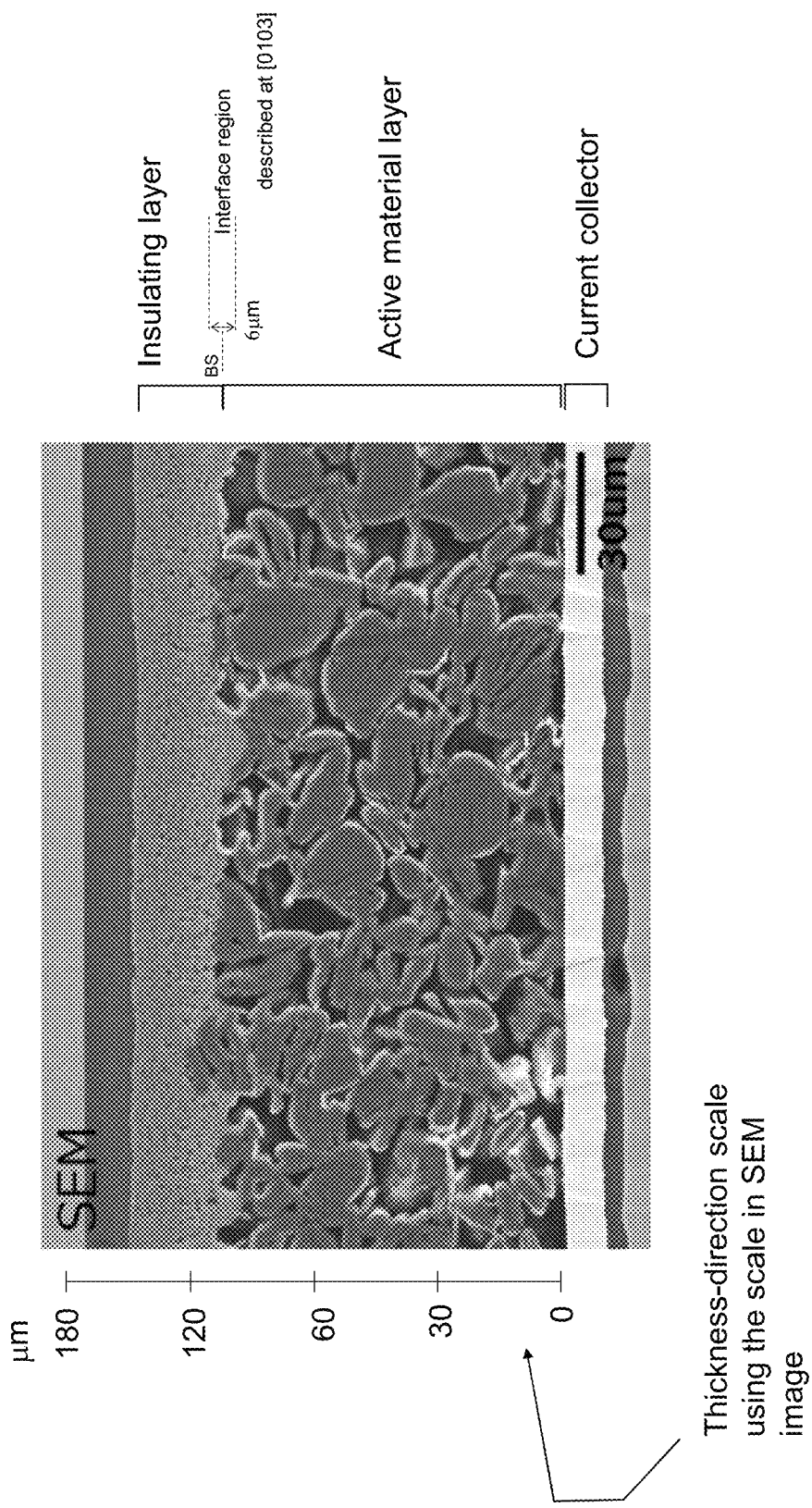
[Fig.6A]

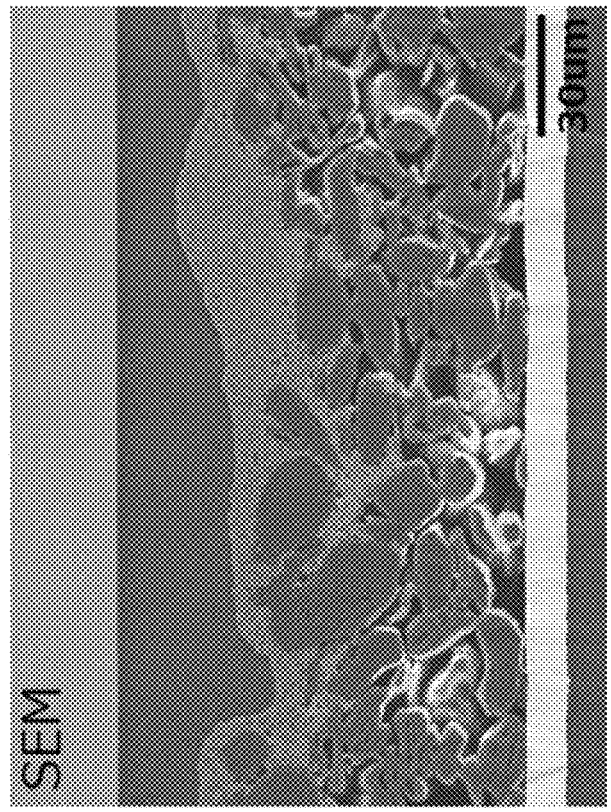
[Fig.6B]

[Fig. 7]
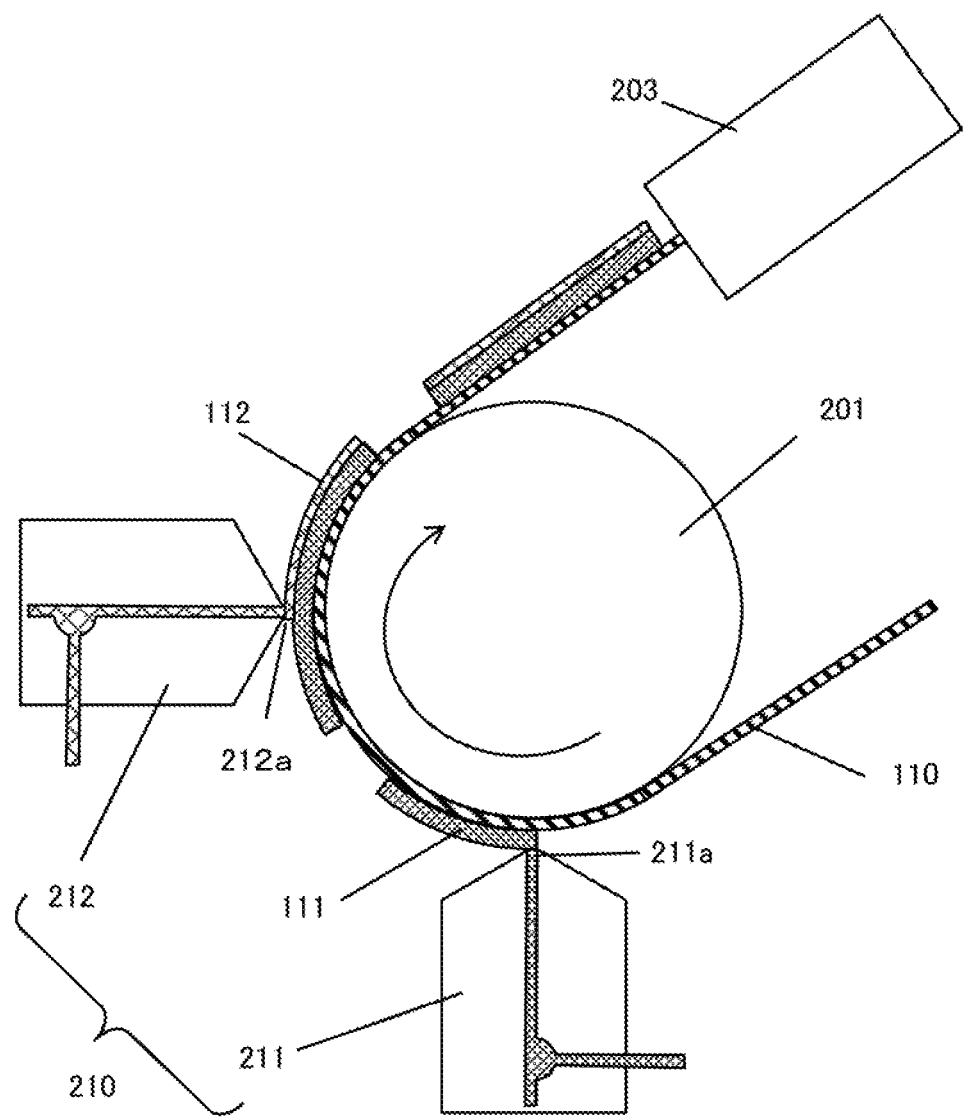

[Fig. 7A]
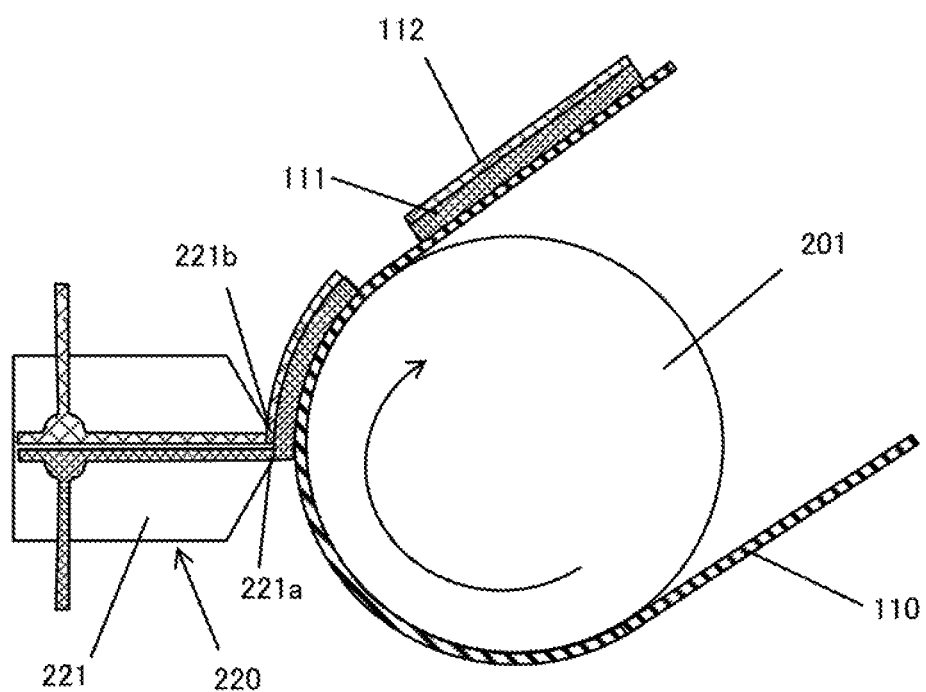

[Fig. 7B]
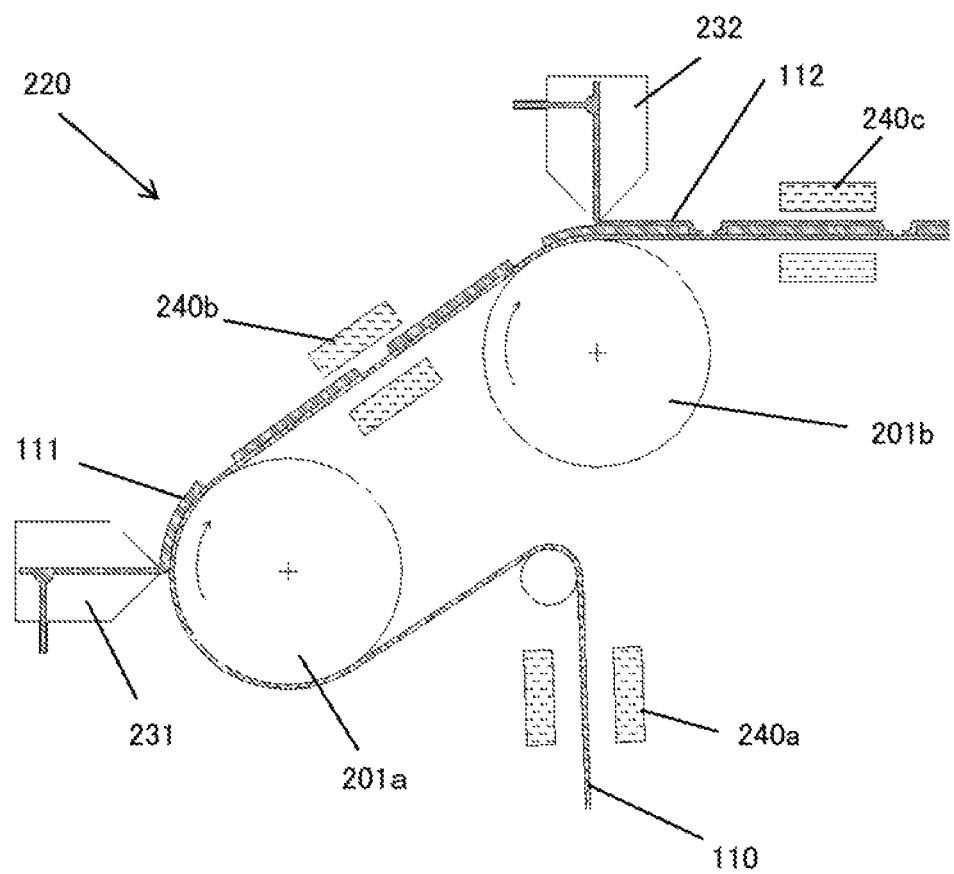

[Fig. 8]
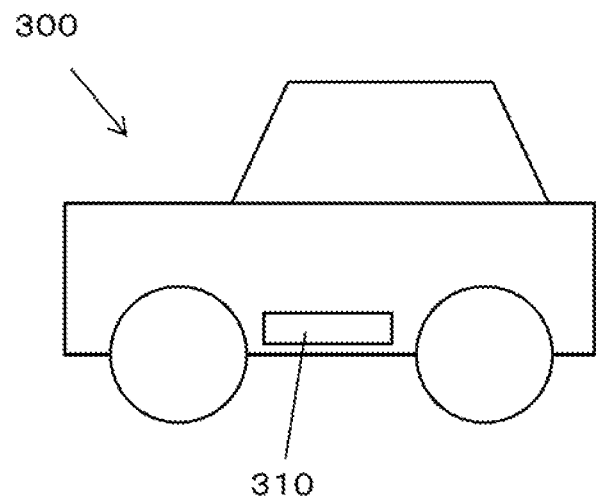
[Fig. 9]
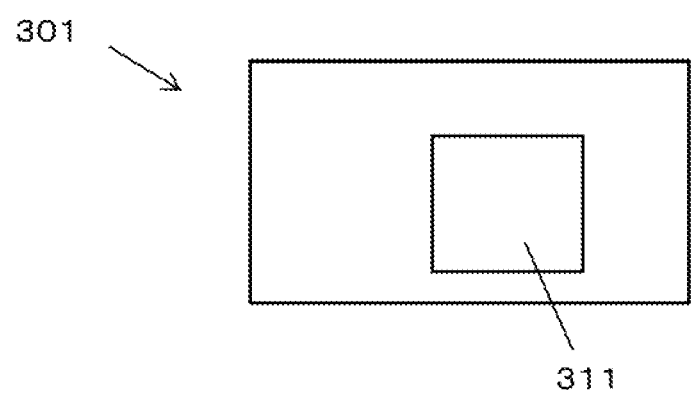

[Fig. 10]
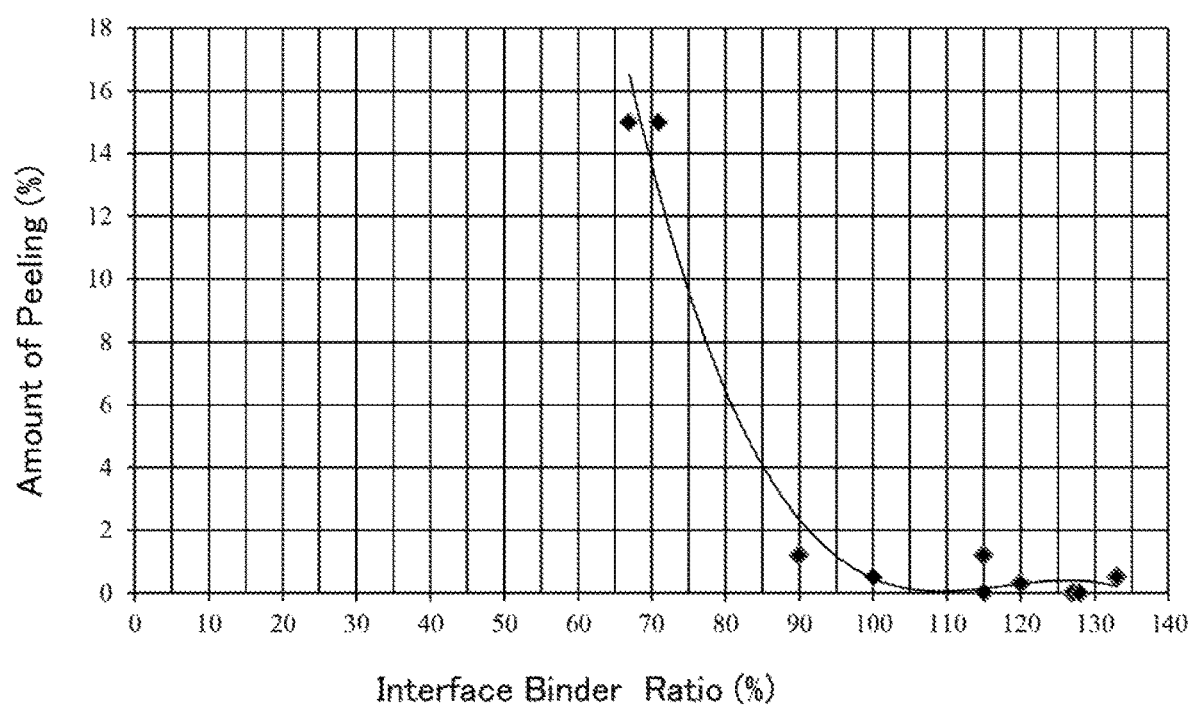

Explanation of "first layer" and "second layer" in claim 6

ELECTRODE FOR SECONDARY BATTERY, SECONDARY BATTERY USING THE ELECTRODE AND METHOD FOR MANUFACTURING THEREOF

CROSS REFERENCE TO RELATED APPLICATIONS

This application is a National Stage of International Application No. PCT/JP2019/004457 filed Feb. 7, 2019, claiming priority based on Japanese Patent Application No. 2018-043757, filed Mar. 12, 2018 and all disclosure thereof are hereby incorporated.

TECHNICAL FIELD

The present invention relates to an electrode used in a secondary battery, particularly an electrode having an insulating layer on an active material layer, a secondary battery having the electrode, and a method for manufacturing them.

BACKGROUND ART

Secondary batteries are widely used as power sources for portable electronic devices such as smart phones, tablet computers, notebook computers, digital cameras, and the like. In addition, secondary batteries have been expanding their application as power sources for electric vehicles and household power supplies. Among them, since lithium ion secondary batteries are high in energy density and light in weight, they are indispensable energy storage devices for current life.

A conventional battery including a secondary battery has a structure in which a positive electrode and a negative electrode, which are electrodes, are opposed to each other with a separator interposed therebetween. The positive electrode and the negative electrode each have a sheet-like current collector and active material layers formed on both sides of the current collector. The separator serves to prevent a short circuit between the positive electrode and the negative electrode and to effectively move ions between the positive electrode and the negative electrode. Conventionally, a polyolefin-based microporous separator made of polypropylene or polyethylene material is mainly used as the separator. However, the melting points of polypropylene and polyethylene materials are generally 110° C. to 160° C. Therefore, when a polyolefin-based separator is used for a battery with a high energy density, the separator melts at a high temperature of the battery, and a short circuit may occur between the electrodes in a large area, which cause smoke and ignition of the battery.

Therefore, in order to improve the safety of the secondary battery, the following techniques are known. Patent Literature 1 (Japanese Patent Laid-Open No. 2013-161771) and Patent Literature 2 (Re-publication of PCT International Publication No. 2015/198519) disclose an electrode having a current collector, an active material layer formed on the surface of the current collector, and an insulating layer (protective layer) formed on the surface of the active material layer. The active material layer contains an active material and a binder, and the insulating layer contains insulating particles and a binder. Further, the electrodes described in the cited documents 1 and 2 are configured so that the concentration of the binder is uneven in the thickness direction thereof. In particular, in the electrode disclosed in Patent Literature 1, in order to increase the adhesion between the electrode film and the insulating layer, the binder concentration of the insulating layer is higher on the side of the active material layer than on the side opposite to the active material layer. Patent Literature 1 discloses that such a structure can be obtained by applying an insulating layer slurry, contacting a solvent containing a solidifying liquid with the insulating layer slurry to solidify the insulating layer slurry, and drying the solidified insulating layer slurry.

CITATION LIST

Patent Literature

Patent Literature 1: Japanese Patent Laid-Open No. 2013-161771
Patent Literature 2: Re-publication of PCT International Publication No. 2015/198519

SUMMARY OF INVENTION

Technical Problem

A structure in which an active material layer and an insulating layer are stacked on a current collector as described in Patent Literatures 1 and 2 is generally formed by the following steps. First, the active material layer slurry is applied onto the current collector and dried to form an active material layer. After that, an insulating layer slurry is applied to the surface of the active material layer and dried to form an insulating layer.

However, when the electrode is manufactured by such a process, the adhesion of the insulating layer to the active material layer tends to be weak. If the adhesive strength of the insulating layer is weak, a part of the insulating layer may peel off from the active material layer when a contracting force in the in-plane direction acts on the insulating layer at a high temperature of the battery or when an external force is applied to the battery, and there was a possibility that part of the active material layer would be exposed. The exposure of the active material layer may cause a short circuit between the positive electrode and the negative electrode.

On the other hand, in the electrode described in Patent Literature 1, the binder concentration in the insulating layer is changed by changing the manufacturing process, and the adhesion of the insulating layer is improved. However, in the manufacturing method described in Patent Literature 1, the number of processes is increased as compared with a general manufacturing method, which may cause a decrease in manufacturing efficiency and an increase in manufacturing cost.

It is an object of the present invention to provide an electrode having an active material layer and an insulating layer formed on a current collector, manufacturing method thereof and the like in which the insulating layer has sufficient adhesion and which can be manufactured without significantly changing the manufacturing process.

Solution to Problem

An electrode used as a positive electrode and a negative electrode of a secondary battery according to the present invention comprises:
a current collector,
an active material layer formed on at least one surface of the current collector and containing an active material and a first binder, and an insulating layer formed on a surface of the active material layer and containing non-conductive particles and a second binder, wherein an interfacial binder ratio, which is a ratio of amount of a binder existing in an interface region between the active material layer and the insulating layer per unit thickness of the interface region to amount of a binder existing in the active material layer per unit thickness of the active material layer, is 85% or more.

A method for manufacturing an electrode used as a positive electrode and a negative electrode of a secondary battery according to the present invention comprises steps of:

forming an active material layer containing an active material and a first binder, and forming an insulating layer containing non-conductive particles and a second binder, wherein the step of forming the insulating layer forms the insulating layer such that an interfacial binder ratio, which is a ratio of amount of a binder existing in an interface region between the active material layer and the insulating layer per unit thickness of the interface region to amount of a binder existing in the active material layer per unit thickness of the active material layer, is 85% or more.

Advantageous Effects of Invention

According to the present invention, an electrode having improved adhesion of the insulating layer to the active material layer can be obtained by defining the amount of binder at the interface between the active material layer and the insulating layer with respect to the amount of binder in the active material layer. Further, such an electrode can be manufactured without significantly changing the manufacturing process with respect to a general manufacturing method.

BRIEF DESCRIPTION OF DRAWINGS

FIG. 1 is an exploded perspective view of a secondary battery according to one embodiment of the present invention.

FIG. 2 is a schematic sectional view of a battery element shown in FIG. 1.

FIG. 3 is a schematic sectional view showing the configuration of a positive electrode and a negative electrode shown in FIG. 2.

FIG. 4A is a sectional view showing an example of arrangement of the positive electrode and the negative electrode in the battery element.

FIG. 4B is a sectional view showing another example of arrangement of the positive electrode and the negative electrode in the battery element.

FIG. 4C is a sectional view showing another example of arrangement of the positive electrode and the negative electrode in the battery element.

FIG. 5 is an exploded perspective view of a secondary battery according to another embodiment of the present invention.

FIG. 6 is a graph showing an example of a binder distribution along a thickness direction of an electrode, which is obtained by a cross-section SEM-EDX.

FIG. 6A is a sectional SEM image of the electrode obtained by simultaneously applying an insulating layer slurry having a solid content ratio of 50% by mass and a viscosity of 20000 mPa·s on an active material slurry.

FIG. 6B is a sectional SEM image of the electrode obtained by simultaneously applying an insulating layer slurry having a solid content ratio of 33 mass % and a viscosity of 2000 mPa·s on the active material slurry.

FIG. 7 is a schematic diagram of one embodiment of an electrode manufacturing apparatus for manufacturing an electrode having the structure shown in FIG. 2.

FIG. 7A is a schematic diagram of another embodiment of the electrode manufacturing apparatus.

FIG. 7B is a schematic diagram of another embodiment of the electrode manufacturing apparatus.

FIG. 8 is a schematic view showing an embodiment of an electric vehicle equipped with a secondary battery.

FIG. 9 is a schematic diagram showing an example of a power storage device equipped with a secondary battery.

FIG. 10 is a graph showing the relationship between the interfacial binder ratio and the peeling amount in Examples 1 to 3 and Comparative Example 1.

DESCRIPTION OF EMBODIMENTS

Figure 11:
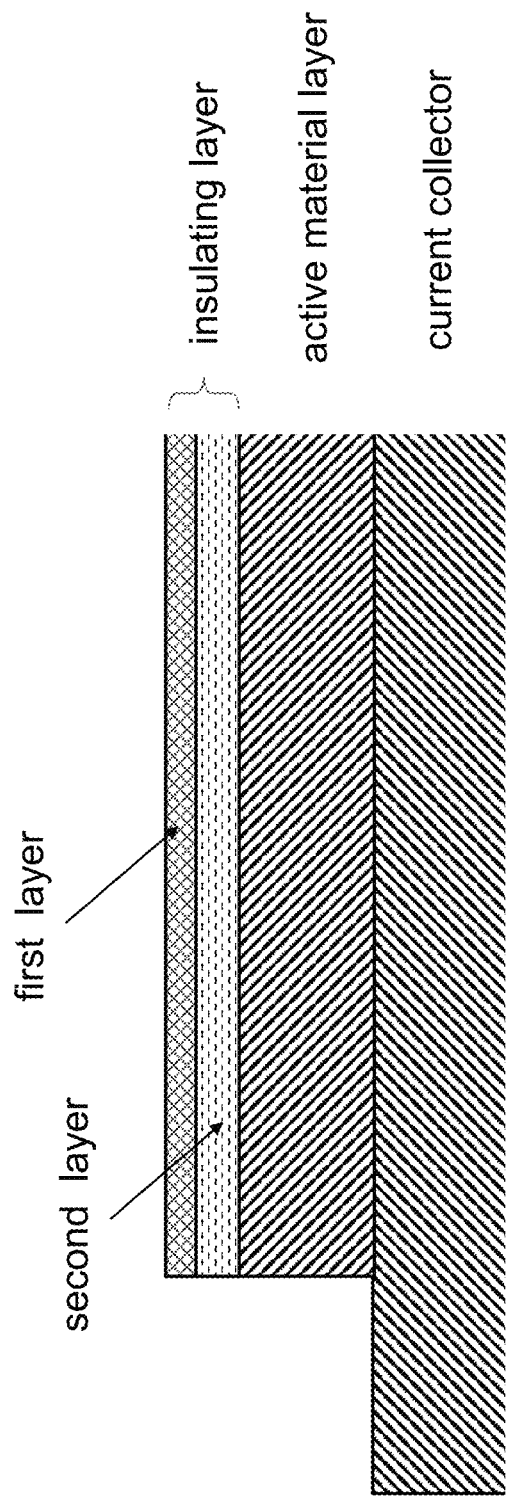
FIG. 11 is a schematic sectional view showing the configuration of a portion of the electrode shown in FIG. 2.

Referring to FIG. 1, an exploded perspective view of a secondary battery 1 according to one embodiment of the present invention is shown, which comprises a battery element 10 and a casing enclosing the battery element 10 together with an electrolytic solution. The casing has casing members 21, 22 that enclose the battery element 10 from both sides in the thickness direction thereof and seal outer circumferential portions thereof to thereby seal the battery element 10 and the electrolytic solution. A positive electrode terminal 31 and a negative electrode terminal 32 are respectively connected to the battery element 10 with protruding part of them from the casing.

As shown in FIG. 2, the battery element 10 has a configuration in which a plurality of positive electrodes 11 and a plurality of negative electrodes 12 are disposed to face each other so as to be alternately positioned. In addition, a separator 13 is disposed between the positive electrode 11 and the negative electrode 12 to ensure ion conduction between the positive electrode 11 and the negative electrode 12 and to prevent a short circuit between the positive electrode 11 and the negative electrode 12. However, the separator 13 is not essential in the present embodiment.

Structures of the positive electrode 11 and the negative electrode 12 will be described with further reference to FIG. 3. In the structure shown in FIG. 3, the positive electrode 11 and the negative electrode 12 are not particularly distinguished, but the structure is applicable to both the positive electrode 11 and the negative electrode 12. The positive electrode 11 and the negative electrode 12 (collectively referred to as "electrode" in a case where these are not distinguished) include a current collector 110 which can be formed of a metal foil, an active material layer 111 formed on one or both surfaces of the current collector 110. The active material layer 111 is preferably formed in a rectangular shape in plan view, and the current collector 110 has a shape having an extended portion 110a extending from a region where the active material layer 111 is formed.

The extended portion 110a of the positive electrode 11 and the extended portion 110a of the negative electrode 12 are formed at positions not overlapping each other in a state where the positive electrode 11 and the negative electrode 12 are laminated. However, the extension portions 110a of the positive electrodes 11 are positioned to overlap with each other, and the extension portions 110a of the negative electrodes 12 are also positioned to overlap with each other. With such arrangement of the extended portions 110a, in each of the plurality of positive electrodes 11, the respective extended portions 110a are collected and welded together to form a positive electrode tab 10a. Likewise, in the plurality of negative electrodes 12, the respective extended portions 110a are collected and welded together to form a negative electrode tab 10b. A positive electrode terminal 31 is electrically connected to the positive electrode tab 10a and a negative electrode terminal 32 is electrically connected to the negative electrode tab 10b.

At least one of the positive electrode 11 and the negative electrode 12 further includes an insulating layer 112 formed on the active material layer 111. The insulating layer 112 is formed in a region where the active material layer 111 is not exposed in plan view and may be formed so as to cover a part of the extended portion 110a. In the case where the active material layer 111 is formed on both surfaces of the current collector 110, the insulating layer 112 may be formed on both the active material layers 111 or only on one of the active material layers 111.

Some examples of the arrangement of the positive electrode 11 and the negative electrode 12 having such a structure are shown in FIGS. 4A to 4C. In the arrangement shown in FIG. 4A, the positive electrode 11 having the insulating layer 112 on both sides and the negative electrode 12 not having the insulating layer are alternately laminated. In the arrangement shown in FIG. 4B, the positive electrode 11 and the negative electrode 12 having the insulating layer 112 on only one side are alternately laminated in such a manner that the respective insulating layers 112 do not face each other. In the arrangement shown in FIG. 4C, positive electrodes 11 having insulating layers 112 on both surfaces and negative electrodes 12 having insulating layers 112 on both surfaces are alternately laminated.

In the structures shown in FIGS. 4A to 4C, since the insulating layer 112 exists between the positive electrode 11 and the negative electrode 12, the separator 13 can be omitted. The positive electrode 11 and the negative electrode 12 are formed into a predetermined shape by punching or the like, and at this time, a large burr may occur. Therefore, when a separator is not necessary, in order to prevent a short circuit between the positive electrode 11 and the negative electrode 12 due to such large burrs, the positive electrode 11 and the negative electrode 12 preferably have insulating layers 112 on both sides.

The structure and arrangement of the positive electrode 11 and the negative electrode 12 are not limited to the above examples and various modifications are possible as long as the positive electrode 11 and the negative electrode 12 are arranged such that the insulating layer 112 exists between the positive electrode 11 and the negative electrode 12 For example, in the structures shown in FIGS. 4A and 4B, the relationship between the positive electrode 11 and the negative electrode 12 can be reversed.

Since the battery element 10 having a planar laminated structure as illustrated has no portion having a small radius of curvature (a region close to a winding core of a winding structure) as compared with the battery element having a wound structure, the battery element 10 has an advantage that it is less susceptible to the volume change of the electrode due to charging and discharging. That is, the battery element having a planar laminated structure is effective for an electrode assembly using an active material that is liable to cause volume expansion.

In the embodiment shown in FIGS. 1 and 2, the positive electrode terminal 31 and the negative electrode terminal 32 are drawn out in opposite directions, but the directions in which the positive electrode terminal 31 and the negative electrode terminal 32 are drawn out may be arbitrary. For example, as shown in FIG. 5, the positive electrode terminal 31 and the negative electrode terminal 32 may be drawn out from the same side of the battery element 10. Alternatively, although not shown, the positive electrode terminal 31 and the negative electrode terminal 32 may also be drawn out from two adjacent sides of the battery element 10. In both of the above case, the positive electrode tab 10a and the negative electrode tab 10b can be formed at positions corresponding to the direction in which the positive electrode terminal 31 and the negative electrode terminal 32 are drawn out.

Furthermore, in the illustrated embodiment, the battery element 10 having a laminated structure having a plurality of positive electrodes 11 and a plurality of negative electrodes 12 is shown. However, the battery element having the winding structure may have one positive electrode 11 and one negative electrode 12.

Hereinafter, parts constituting the battery element 10 and the electrolytic solution will be described in detail. In the following description, although not particularly limited, elements in the lithium ion secondary battery will be described. Further, the insulating layer has a structure that can be included in both the positive electrode and the negative electrode, and the structure and manufacturing method of the insulating layer itself may be common regardless of whether it is included in the positive electrode or the negative electrode. Therefore, the insulating layer will be described separately from the positive electrode and the negative electrode.

[1] Negative Electrode

The negative electrode has a structure in which, for example, a negative electrode active material is adhered to a negative electrode current collector by a negative electrode binder, and the negative electrode active material is laminated on the negative electrode current collector as a negative electrode active material layer. Any material capable of absorbing and desorbing lithium ions with charge and discharge can be used as the negative electrode active material in the present embodiment as long as the effect of the present invention is not significantly impaired. Normally, as in the case of the positive electrode, the negative electrode is also configured by providing the negative electrode active material layer on the current collector. Similarly to the positive electrode, the negative electrode may also have other layers as appropriate.

The negative electrode active material is not particularly limited as long as it is a material capable of absorbing and desorbing lithium ions, and a known negative electrode active material can be arbitrarily used. For example, it is preferable to use carbonaceous materials such as coke, acetylene black, mesophase microbead, graphite and the like; lithium metal; lithium alloy such as lithium-silicon, lithium-tin; lithium titanate and the like as the negative electrode active material. Among these, carbonaceous materials are most preferably used from the viewpoint of good cycle characteristics and safety and further excellent continuous charge characteristics. One negative electrode active material may be used alone, or two or more negative electrode active materials may be used in combination in any combination and ratio.

Furthermore, the particle diameter of the negative electrode active material is arbitrary as long as the effect of the present invention is not significantly impaired. However, in terms of excellent battery characteristics such as initial efficiency, rate characteristics, cycle characteristics, etc., the particle diameter is usually 1 μm or more, preferably 15 μm or more, and usually about 50 μm or less, preferably about 30 μm or less. Furthermore, for example, it can be also used as the carbonaceous material such as a material obtained by coating the carbonaceous material with an organic substance such as pitch or the like and then calcining the carbonaceous material, or a material obtained by forming amorphous carbon on the surface using the CVD method or the like. Examples of the organic substances used for coating include coal tar pitch from soft pitch to hard pitch; coal heavy oil such as dry distilled liquefied oil; straight run heavy oil such as atmospheric residual oil and vacuum residual oil; petroleum heavy oil such as decomposed heavy oil (for example, ethylene heavy end) produced as a by-product upon thermal decomposition of crude oil, naphtha and the like. A solid residue obtained by distilling these heavy oil at 200 to 400° C. to result in a solid residue and then pulverizing the solid residue to a size of 1 to 100 μm can also be used as the organic substance. In addition, vinyl chloride resin, phenol resin, imide resin and the like can also be used as the organic substance.

In one embodiment of the present invention, the negative electrode includes a metal and/or a metal oxide and carbon as the negative electrode active material. Examples of the metal include Li, Al, Si, Pb, Sn, In, Bi, Ag, Ba, Ca, Hg, Pd, Pt, Te, Zn, La, and alloys of two or more of these. These metals or alloys may be used as a mixture of two or more. In addition, these metals or alloys may contain one or more non-metal elements.

Examples of the metal oxide include silicon oxide, aluminum oxide, tin oxide, indium oxide, zinc oxide, lithium oxide, and composites of these. In the present embodiment, tin oxide or silicon oxide is preferably contained as the negative electrode active material, and silicon oxide is more preferably contained. This is because silicon oxide is relatively stable and hardly causes reaction with other compounds. Also, for example, 0.1 to 5 mass % of one or more elements selected from nitrogen, boron and sulfur can be added to the metal oxide. In this way, the electrical conductivity of the metal oxide can be improved. Also, the electrical conductivity can be similarly improved by coating the metal or the metal oxide with an electro-conductive material such as carbon by vapor deposition or the like.

Examples of the carbon include graphite, amorphous carbon, diamond-like carbon, carbon nanotube, and composites of these. Highly crystalline graphite has high electrical conductivity and is excellent in adhesiveness with respect to a negative electrode current collector made of a metal such as copper and voltage flatness. On the other hand, since amorphous carbon having a low crystallinity has a relatively small volume expansion, it has a high effect of alleviating the volume expansion of the entire negative electrode, and deterioration due to non-uniformity such as crystal grain boundaries and defects hardly occurs.

The metal and the metal oxide have the feature that the capacity of accepting lithium is much larger than that of carbon. Therefore, the energy density of the battery can be improved by using a large amount of the metal and the metal oxide as the negative electrode active material. In order to achieve high energy density, it is preferable that the content ratio of the metal and/or the metal oxide in the negative electrode active material is high. A larger amount of the metal and/or the metal oxide is preferable, since it increases the capacity of the negative electrode as a whole. The metal and/or the metal oxide is preferably contained in the negative electrode in an amount of 0.01% by mass or more of the negative electrode active material, more preferably 0.1% by mass or more, and further preferably 1% by mass or more. However, the metal and/or the metal oxide has large volume change upon absorbing and desorbing of lithium as compared with carbon, and electrical junction may be lost. Therefore, the amount of the metal and/or the metal oxide in the negative active material is 99% by mass or less, preferably 90% by mass or less, more preferably 80% by mass or less. As described above, the negative electrode active material is a material capable of reversibly absorbing and desorbing lithium ions with charge and discharge in the negative electrode, and does not include other binder and the like.

For example, the negative electrode active material layer may be formed into a sheet electrode by roll-forming the above-described negative electrode active material, or may be formed into a pellet electrode by compression molding. However, usually, the negative electrode active material layer can be formed by applying and drying an application liquid on a current collector, where the application liquid may be obtained by slurrying the above-described negative electrode active material, a binder (binding agent), and various auxiliaries contained as necessary with a solvent.

The negative electrode binder is not particularly limited, and examples thereof include polyvinylidene fluoride, vinylidene fluoride-hexafluoropropylene copolymer, vinylidene fluoride-tetrafluoroethylene copolymer, styrene-butadiene copolymer rubber, polytetrafluoroethylene, polypropylene, polyethylene, acrylic, acrylic acid, sodium acrylate, polyimide, polyamide imide and the like. In addition to the above, styrene butadiene rubber (SBR) and the like can be included. When an aqueous binder such as an SBR emulsion is used, a thickener such as carboxymethyl cellulose (CMC) can also be used. The amount of the negative electrode binder to be used is preferably 0.5 to 20 parts by mass relative to 100 parts by mass of the negative electrode active material from the viewpoint of a trade-off between "sufficient binding strength" and "high energy". The negative electrode binders may be mixed and used.

As the material of the negative electrode current collector, a known material can be arbitrarily used, and for example, a metal material such as copper, nickel, stainless steel, aluminum, chromium, silver and an alloy thereof is preferably used from the viewpoint of electrochemical stability. Among them, copper is particularly preferable from the viewpoint of ease of processing and cost. It is also preferable that the negative electrode current collector is also subjected to surface roughening treatment in advance. Further, the shape of the current collector is also arbitrary, and examples thereof include a foil shape, a flat plate shape and a mesh shape. A perforated type current collector such as an expanded metal or a punching metal can also be used.

The negative electrode can be produced, for example, by forming a negative electrode active material layer containing a negative electrode active material and a negative electrode binder on a negative electrode current collector. Examples of a method for forming the negative electrode active material layer include a doctor blade method, a die coater method, a CVD method, a sputtering method, and the like. After forming the negative electrode active material layer in advance, a thin film of aluminum, nickel or an alloy thereof may be formed by a method such as vapor deposition, sputtering or the like to obtain a negative electrode current collector.

An electroconductive auxiliary material may be added to a coating layer containing the negative electrode active material for the purpose of lowering the impedance.

Examples of the electroconductive auxiliary material include flaky, sooty, fibrous carbonaceous microparticles and the like such as graphite, carbon black, acetylene black, vapor grown carbon fiber (for example, VGCF (registered trademark) manufactured by Showa Denko K.R.), and the like.

[2] Positive Electrode

The positive electrode refers to an electrode on the high potential side in a battery. As an example, the positive electrode includes a positive electrode active material capable of reversibly absorbing and desorbing lithium ions with charge and discharge, and has a structure in which a positive electrode active material is laminated on a current collector as a positive electrode active material layer integrated with a positive electrode binder. In one embodiment of the present invention, the positive electrode has a charge capacity per unit area of 3 mAh/cm² or more, preferably 3.5 mAh/cm² or more. From the viewpoint of safety and the like, the charge capacity per unit area of the positive electrode is preferably 15 mAh/cm² or less. Here, the charge capacity per unit area is calculated from the theoretical capacity of the active material. That is, the charge capacity of the positive electrode per unit area is calculated by (theoretical capacity of the positive electrode active material used for the positive electrode)/(area of the positive electrode). Note that the area of the positive electrode refers to the area of one surface, not both surfaces of the positive electrode.

The positive electrode active material in the present embodiment is not particularly limited as long as it is a material capable of absorbing and desorbing lithium, and can be selected from several viewpoints. A high-capacity compound is preferably contained from the viewpoint of high energy density. Examples of the high-capacity compound include nickel lithate ($LiNiO_2$) and a lithium nickel composite oxide obtained by partially replacing Ni of nickel lithate with another metal element, and a layered lithium nickel composite oxide represented by formula (A) below is preferable.

$$Li_yNi_{(1-x)}M_xO_2 \qquad (A)$$

(provided that $0 \leq x < 1$, $0 < y \leq 1.2$, and M is at least one element selected from the group consisting of Co, Al, Mn, Fe, Ti, and B.)

From the viewpoint of high capacity, the Ni content is preferably high, or that is to say, x is less than 0.5 in formula (A), and more preferably 0.4 or less. Examples of such compounds include $Li_\alpha Ni_\beta Co_\gamma Mn_\delta O_2$ ($0 < \alpha \leq 1.2$, preferably $1 \leq \alpha \leq 1.2$, $\beta + \gamma + \delta = 1$, $\beta \geq 0.7$, and $\gamma \geq 0.2$) and $Li_\alpha Ni_\beta Co_\gamma Al_\delta O_2$ ($0 < \alpha \leq 1.2$ preferably $1 \leq \alpha \leq 1.2$, $\beta + \gamma + \delta = 1$, $\beta \leq 0.6$ preferably $\beta \geq 0.7$, $\gamma \leq 0.2$), and, in particular, $LiNi_\beta Co_\gamma Mn_\delta O_2$ ($0.75 \leq \beta \leq 0.85$, $0.05 \leq \gamma \leq 0.15$, $0.10 \leq \delta \leq 0.20$). More specifically, for example, $LiNi_{0.8}Co_{0.05}Mn_{0.15}O_2$, $LiNi_{0.8}Co_{0.1}Mn_{0.1}O_2$, $LiNi_{0.8}Co_{0.15}Al_{0.05}O_2$, and $LiNi_{0.8}Co_{0.1}Al_{0.1}O_2$ can be preferably used.

From the viewpoint of heat stability, it is also preferable that the Ni content does not exceed 0.5, or that is to say, x is 0.5 or more in formula (A). It is also preferable that a certain transition metal does not account for more than half. Examples of such compounds include $Li_\alpha Ni_\beta Co_\gamma Mn_\delta O_2$ ($0 < \alpha \leq 1.2$ preferably $1 \leq \alpha \leq 1.2$, $\beta + \gamma + \delta = 1$, $0.2 \leq \beta \leq 0.5$, $0.1 \leq \gamma \leq 0.4$, $0.1 \leq \delta \leq 0.4$). More specific examples include $LiNi_{0.4}Co_{0.3}Mn_{0.3}O_2$ (abbreviated as NCM433), $LiNi_{1/3}Co_{1/3}Mn_{1/3}O_2$, $LiNi_{0.5}Co_{0.2}Mn_{0.3}O_2$ (abbreviated as NCM523), and $LiNi_{0.5}Co_{0.3}Mn_{0.2}O_2$ (abbreviated as NCM532) (provided that these compounds include those in which the content of each transition metal is varied by about 10%).

Also, two or more compounds represented by formula (A) may be used as a mixture, and, for example, it is also preferable to use NCM532 or NCM523 with NCM433 in a range of 9:1 to 1:9 (2:1 as a typical example) as a mixture. Moreover, a battery having a high capacity and a high heat stability can be formed by mixing a material having a high Ni content (x is 0.4 or less) with a material having a Ni content not exceeding 0.5 (x is 0.5 or more, such as NCM433) in formula (A).

Other than the above positive electrode active materials, examples include lithium manganates having a layered structure or a spinel structure, such as $LiMnO_2$, $Li_xMn_2O_4$ ($0 < x < 2$), $Li_2MnO_3$, and $Li_xMn_{1.5}Ni_{0.5}O_4$ ($0 < x < 2$); $LiCoO_2$ and those obtained by partially replacing these transition metals with other metals; those having an excess of Li based on the stoichiometric compositions of these lithium transition metal oxides; and those having an olivine structure such as $LiFePO_4$. Moreover, materials obtained by partially replacing these metal oxides with Al, Fe, P, Ti, Si, Pb, Sn, In, Bi, Ag, Ba, Ca, Hg, Pd, Pt, Te, Zn, La, or the like can be used as well. One of the positive electrode active materials described above may be used singly, or two or more can be used in combination.

For example, the positive electrode active material layer may be formed into a sheet electrode by roll-forming the above-described positive electrode active material, or may be formed into a pellet electrode by compression molding as in the case of the negative electrode active material layer. However, usually, the positive electrode active material layer can be formed by applying and drying an application liquid on a current collector, where the application liquid may be obtained by slurrying the above-described positive electrode active material, a binder (binding agent), and various auxiliaries contained as necessary with a solvent.

A positive electrode binder similar to the negative electrode binder can be used. Among them, polyvinylidene fluoride or polytetrafluoroethylene is preferable from the viewpoint of versatility and low cost, and polyvinylidene fluoride is more preferable. The amount of the positive electrode binder used is preferably 2 to 15 parts by mass relative to 100 parts by mass of the positive electrode active material from the viewpoint of a trade-off between "sufficient binding strength" and "high energy".

An electroconductive auxiliary material may be added to a coating layer containing the positive electrode active material for the purpose of lowering the impedance. Examples of the conductive auxiliary material include flaky, sooty, fibrous carbonaceous microparticles and the like such as graphite, carbon black, acetylene black, vapor grown carbon fiber (for example, VGCF manufactured by Showa Denko K.R.) and the like.

A positive electrode current collector similar to the negative electrode current collector can be used. In particular, as the positive electrode, a current collector using aluminum, an aluminum alloy, iron, nickel, chromium, molybdenum type stainless steel is preferable.

A conductive auxiliary material may be added to the positive electrode active material layer containing the positive electrode active material for the purpose of reducing impedance. Examples of the conductive auxiliary material include carbonaceous fine particles such as graphite, carbon black, and acetylene black.

[3] Insulating Layer

The insulating layer forms a part of the positive electrode and the negative electrode together with the current collector and the active material layer by being formed on the surface of the active material layer in the positive electrode and the negative electrode described above. The material and the like of the insulating layer will be described in detail below.

(Material and Manufacturing Method Etc.)

The insulating layer can be formed by applying a slurry composition for an insulating layer so as to cover a part of the active material layer of the positive electrode or the negative electrode and drying and removing a solvent. Although the insulating layer may be formed on only one side of the active material layer, there is an advantage that the warpage of the electrode can be reduced by forming the insulating layer on both side (in particular, as a symmetrical structure).

An insulating layer slurry is a slurry composition for forming a porous insulating layer. Therefore, the "insulating layer" can also be referred to as "porous insulating layer". The insulating layer slurry comprises non-conductive particles (also called non-conductive filler) and a binder (or a binding agent) having a specific composition, and the non-conductive particles, the binder and optional components are uniformly dispersed as a solid content in a solvent.

It is desirable that the non-conductive particles stably exist in the use environment of the lithium ion secondary battery and are electrochemically stable. As the non-conductive particles, for example, various inorganic particles, organic particles and other particles can be used. Among them, inorganic oxide particles or organic particles are preferable, and in particular, from the viewpoint of high thermal stability of the particles, it is more preferable to use inorganic oxide particles. Metal ions in the particles sometimes form salts near the electrode, which may cause an increase in the internal resistance of the electrode and a decrease in cycle characteristics of the secondary battery. The other particles include particles to which electrical insulating property is given by surface treatment of the surface of fine powder with a non-electrically conductive substance. The fine powder can be made from a conductive metal, compound and oxide such as carbon black, graphite, $SnO_2$, ITO and metal powder. Two or more of the above-mentioned particles may be used in combination as the non-conductive particles.

Examples of the inorganic particles include inorganic oxide particles such as aluminum oxide, silicon oxide, magnesium oxide, titanium oxide, $BaTiO_2$, ZrO, alumina-silica composite oxide; inorganic nitride particles such as aluminum nitride and boron nitride; covalent crystal particles such as silicon, diamond and the like; sparingly soluble ionic crystal particles such as barium sulfate, calcium fluoride, barium fluoride and the like; clay fine particles such as talc and montmorillonite. These particles may be subjected to element substitution, surface treatment, solid solution treatment, etc., if necessary, and may be used singly or in combination of two or more kinds. Among them, inorganic oxide particles are preferable from the viewpoints of stability in the electrolytic solution and potential stability.

The shape of the non-conductive particles is not particularly limited, and may be spherical, needle-like, rod-like, spindle-shaped, plate-like, or the like.

Examples of the plate-like non-conductive particles, especially inorganic particles, preferably used include various commercially available products such as "SUNLOVELY" ($SiO_2$) manufactured by AGC Si-Tech Co., Ltd., pulverized product of "NST-B 1" ($TiO_2$) manufactured by Ishihara Sangyo Kaisha, Ltd., plate like barium sulfate "H series", "HL series" manufactured by Sakai Chemical Industry Co., Ltd., "Micron White" (Talc) manufactured by Hayashi Kasei Co., Ltd., "Benger" (bentonite) manufactured by Hayashi Kasei Co., Ltd., "BMM" and "BMT" (boehmite) manufactured by Kawaii Lime Industry Co., Ltd., "Serasur BMT-B" [alumina ($Al_2O_3$)] manufactured by Kawaii Lime Industry Co., Ltd., "Serath" (alumina) manufactured by Kinsei Matec Co., Ltd., "AKP series" (alumina) manufactured by Sumitomo Chemical Co., Ltd., and "Hikawa Mica Z-20" (sericite) manufactured by Hikawa Mining Co., Ltd. In addition, $SiO_2$, $Al_2O_3$, and ZrO can be produced by the method disclosed in Japanese Patent Laid-Open No. 2003-206475.

When the shape of the non-conductive particles is spherical, the average particle diameter of the non-conductive particles is preferably in the range of 0.005 to 10 µm, more preferably 0.1 to 5 µm, particularly preferably 0.3 to 2 µm. When the average particle diameter of the non-conductive particles is in the above range, the dispersion state of the porous insulating layer slurry is easily controlled, so that it is easy to manufacture a porous insulating layer having a uniform and predetermined thickness. In addition, such average particle diameter provides the following advantages. The adhesion to the binder is improved, and even when the porous insulating layer is wound, it is possible to prevent the non-conductive particles from peeling off, and as a result, sufficient safety can be achieved even if the porous insulating layer is thinned. Since it is possible to suppress an increase in the particle packing ratio in the porous insulating layer, it is possible to suppress a decrease in ion conductivity in the porous insulating layer. Furthermore, the porous insulating layer can be made thin.

The average particle diametersize of the non-conductive particles can be obtained by arbitrarily selecting 50 primary particles from an SEM (scanning electron microscope) image in an arbitrary field of view, carrying out image analysis, and obtaining the average value of circle equivalent diameters of each particle.

The particle diameter distribution (CV value) of the non-conductive particles is preferably 0.5 to 40%, more preferably 0.5 to 30%, particularly preferably 0.5 to 20%. By setting the particle diameter distribution of the non-conductive particles within the above range, a predetermined gap between the non-conductive particles is maintained, so that it is possible to suppress an increase in resistance due to the inhibition of movement of lithium. The particle diameter distribution (CV value) of the non-conductive particles can be determined by observing the non-conductive particles with an electron microscope, measuring the particle diameter of 200 or more particles, determining the average particle diameter and the standard deviation of the particle diameter, and calculating (Standard deviation of particle diameter)/(average particle diameter). The larger the CV value means the larger variation in particle diameter.

When the solvent contained in the insulating layer slurry is a non-aqueous solvent, a polymer dispersed or dissolved in a non-aqueous solvent can be used as a binder. As the polymer dispersed or dissolved in the non-aqueous solvent, polyvinylidene fluoride (PVdF), polytetrafluoroethylene (PTFE), polyhexafluoropropylene (PHFP), polytrifluoroethylene chloride (PCTFE), polyp erfluoroalkoxyfluoroethylene, polyimide, polyamideimide, and the like can be used as a binder, and it is not limited thereto.

In addition, a binder used for binding the active material layer can also be used.

When the solvent contained in the insulating layer slurry is an aqueous solvent (a solution using water or a mixed solvent containing water as a main component as a dispersion medium of the binder), a polymer dispersed or dissolved in an aqueous solvent can be used as a binder. A polymer dispersed or dissolved in an aqueous solvent includes, for example, an acrylic resin. As the acrylic resin, it is preferably to use homopolymers obtained by polymerizing monomers such as acrylic acid, methacrylic acid, acrylamide, methacrylamide, 2-hydroxyethyl acrylate, 2-hydroxyethyl methacrylate, methyl methacrylate, ethylhexyl acrylate, butyl acrylate. The acrylic resin may be a copolymer obtained by polymerizing two or more of the above monomers. Further, two or more of the homopolymer and the copolymer may be mixed. In addition to the above-mentioned acrylic resin, polyolefin resins such as styrene butadiene rubber (SBR) and polyethylene (PE), polytetrafluoroethylene (PTFE), and the like can be used. These polymers can be used singly or in combination of two or more kinds. Among them, it is preferable to use an acrylic resin. The form of the binder is not particularly limited, and particles in the form of particles (powder) may be used as they are, or those prepared in a solution state or an emulsion state may be used. Two or more kinds of binders may be used in different forms.

The insulating layer may contain a material other than the above-described non-conductive particles and binder, if necessary. Examples of such material include various polymer materials that can function as a thickener for the insulating layer slurry, which will be described later. In particular, when an aqueous solvent is used, it is preferable to contain a polymer functioning as the thickener. As the polymer functioning as the thickener, carboxymethyl cellulose (CMC) or methyl cellulose (MC) is preferably used.

Although not particularly limited, the ratio of the non-conductive particles to the entire insulating layer is suitably about 70 mass % or more (for example, 70 mass % to 99 mass %), preferably 80 mass % or more (for example, 80 mass % to 99 mass %), and particularly preferably about 90 mass % to 95 mass %.

The ratio of the binder in the insulating layer is suitably about 1 to 30 mass % or less, preferably 5 to 20 mass % or less. In the case of containing an insulating layer-forming component other than the inorganic particles and the binder, for example, a thickener, the content ratio of the thickener is preferably about 10 mass % or less, more preferably about 7 mass % or less. If the ratio of the binder is too small, strength (shape retentivity) of the insulating layer itself and adhesion to the active material layer are lowered, which may cause defects such as cracking and peeling. If the ratio of the binder is too large, gaps between the particles of the insulating layer become insufficient, and the ion permeability in the insulating layer may decrease in some cases.

In order to maintain ion conductivity, the porosity (void ratio) (the ratio of the pore volume to the apparent volume) of the insulating layer is preferably 20% or more, more preferably 30% or more. However, if the porosity is too high, falling off or cracking of the insulating layer due to friction or impact applied to the insulating layer occurs, the porosity is preferably 80% or less, more preferably 70% or less.

The porosity can be calculated from the ratio of the materials constituting the insulating layer, the true specific gravity and the coating thickness.

The insulating layer is usually composed of a single layer in which non-conductive particles are evenly dispersed. However, the insulating layer may be composed of a plurality of layers including a first layer containing non-conductive particles and a second layer containing no non-conductive particles. In this case, the layer containing no non-conductive particles can be referred to as a binder layer because most of the layer is composed of a binder. The binder layer is provided between the active material layer and the first layer containing non-conductive particles. By including the binder layer in the insulating layer, the adhesion between the active material layer and the insulating layer can be further improved. The binder contained in the first layer and the binder contained in the second layer preferably contain the same components, and more preferably the same binder, from the viewpoint of improving the adhesion between the two layers.

(Forming of Insulating Layer)

A method of forming the insulating layer will be described. As a material for forming the insulating layer, a paste type material (including slurry form or ink form, the same applies below) mixed and dispersed with a non-conductive filler, a binder and a solvent can be used.

A solvent used for the insulating layer slurry includes water or a mixed solvent mainly containing water. As a solvent other than water constituting such a mixed solvent, one or more kinds of organic solvents (lower alcohols, lower ketones, etc.) which can be uniformly mixed with water can be appropriately selected and used. Alternatively, it may be an organic solvent such as N-methylpyrrolidone (NMP), pyrrolidone, methyl ethyl ketone, methyl isobutyl ketone, cyclohexanone, toluene, dimethylformamide, dimethylacetamide, or a combination of two or more thereof. The content of the solvent in the insulating layer slurry is not particularly limited, and it is preferably 50%, or less of the entire slurry, and it is preferably 30% or high.

The operation of mixing the non-conductive particles and the binder with the solvent can be carried out by using a suitable kneading machine such as a ball mill, a homodisper, Disper Mill (registered trademark), Clearmix (registered trademark), Filmix (registered trademark), an ultrasonic dispersing machine.

For the operation of applying the insulating layer slurry, conventional general coating means can be used without restricting. For example, a predetermined amount of the insulating layer slurry can be applied by coating in a uniform thickness by means of a suitable coating device (a gravure coater, a slit coater, a die coater, a comma coater, a dip coater, etc.). When applying the slurry having a high viscosity, among these, it is preferable to use the slit coater and the die coater that extrude and apply the slurry with a pump.

Thereafter, the solvent in the insulating layer slurry may be removed by drying the coating material by means of a suitable drying means.

The applying procedure of the insulating layer slurry includes a simultaneous applying method and a sequential applying method. The simultaneous applying method is a method of applying the active material layer slurry on the current collector, applying the active material layer slurry on the active material layer slurry before the applied active material layer slurry is dried, and then drying the active material layer slurry and the insulating layer slurry. The sequential applying method is a method of applying an active material layer slurry, drying the applied active material layer slurry to form the active material layer, and then, applying an insulating layer slurry on the active material layer, drying it to form the insulating layer. In the case of the sequential applying method, a step of pressurizing the active material layer may be included before forming the insulating layer.

(Thickness)

The thickness of the insulating layer is preferably 1 µm or more and 30 µm or less, and more preferably 2 µm or more and 15 µm or less.

[4] Interfacial Binder Ratio

As described above, the active material layer and the insulating layer contain a binder. One of the characteristics of the present embodiment is that it has a specific interfacial binder ratio.

The interfacial binder ratio is given by a ratio of amount Bt2 of the binder existing in an interface region between the active material layer and the insulating layer per unit thickness of the interface region to amount Bt1 of the binder existing in the active material layer per unit thickness of the active material layer. That is, the interfacial binder ratio is given by the following equation, interfacial binder ratio=Bt2/Bt1.

Here, the binder contained in the active material layer is given as a first binder Ba, the binder contained in the insulating layer is given as a second binder Bb, the thickness of the active material layer is given as Ta, and the thickness of the interface region is given as Tb. In forming the insulating layer, the second binder Bb contained in the insulating layer penetrates into the active material layer, so that both the first binder Ba and the second binder Bb exist in the active material layer. Similarly, both the first binder Ba and the second binder Bb also exist in the interface region. Therefore, the amount Bt1 of the binder existing in the active material layer per unit thickness of the active material layer can be expressed by (Ba+Bb)/Ta. Similarly, the amount Bt2 of the binder existing in the interface region per unit thickness of the interface region can be expressed by (Ba+Bb)/Tb. The first binder does not specify the type of binder, but means all types of binder contained in the active material layer. Therefore, the first binder may be composed of one kind of binder or may be composed of plural kinds of binders. The same applies to the second binder.

In the present embodiment, the interfacial binder ratio is 85% or more. In order to further improve the adhesion between the active material layer and the insulating layer, the first binder and the second binder preferably contain the same component, and more preferably they are the same binder.

By specifying the interfacial binder ratio as described above, it is possible to secure sufficient adhesion between the active material layer and the insulating layer. As a result, the insulating layer is less likely to be peeled from the active material layer even at high temperatures or when an external force is applied to the battery, and a short circuit between the positive electrode and the negative electrode can be suppressed.

The "interface region (hereinafter referred to as BA)" between the active material layer and the insulating layer can be defined by using a cross-sectional SEM image obtained by imaging the cross section of the obtained electrode with a SEM (Scanning Electron Microscope). Specifically, first, the interface (hereinafter referred to as BS) between the active material layer and the insulating layer is determined from the cross-sectional SEM image. The interface region BA is defined as an region having a range of 6 μm in the thickness direction with the interface BS as the center.

In defining the interface BS, when the active material contained in the active material layer and the non-conductive particles contained in the insulating layer are clearly separated as layers, it is preferable to determine the layer containing the active material as the active material layer and the layer containing no active material as the insulating layer based on whether or not the active material exists. Accordingly, even when the insulating layer has the first layer containing the non-conductive particles and the second layer not containing the non-conductive particles (binder layer), the interface BS between the active material layer and the insulating layer can be accurately determined.

However, particularly when the insulating layer is composed of a single layer, the active material contained in the active material layer and the non-conductive particles contained in the insulating layer are mixed depending on the manufacturing method of the electrode, and the interface BS may not be clearly determined. In this case, the center position in the thickness direction of the mixed layer in which the active material and the non-conductive particles are mixed is determined as the interface BS between the active material layer and the insulating layer.

On the other hand, the amount of the binder (the amount of the binder including both the first binder and the second binder) can be measured by a cross-section SEM-EDX in which SEM and EDX (Energy Dispersive X-ray Spectroscopy) are combined. Specifically, while scanning the cross section of the electrode in the thickness direction by line scanning, the electrode is irradiated with an electron beam to extract the characteristic X-rays emitted from each element contained in the binder, for example, as shown in FIG. 6, the distribution of the binder amount A along the thickness direction D from the electrode surface is obtained. Then, the obtained distribution is associated with the interface BS and the interface region BA determined above, and the binder amount A in the interface region BA is calculated by integration. By dividing the calculated binder amount A in the interface region BA by the thickness of the interface region BA, the binder amount per unit thickness of the interface region BA existing in the interface region BA is calculated.

Further, in the binder distribution graph shown in FIG. 6, the position of the current collector surface C is determined by the cross-sectional SEM image, and the range from the end on the active material layer side of the interface region BA between the active material layer and the insulating layer to the current collector surface C is defined as the active material layer. The binder amount A contained in the defined active material layer is calculated by integration and the calculated binder amount A is divided by the thickness of the active material layer, whereby the binder amount per unit thickness of the active material layer existing in the active material layer is calculated.

The binder amount for the interface region BA calculated as described above is divided by the binder amount for the active material layer. Thus, the ratio of the binder amount existing in the interface region BA per unit thickness of the interface region BA to the binder amount existing in the active material layer per unit thickness of the active material layer, that is, the interfacial binder ratio is obtained.

The electrode of this embodiment is characterized by the ratio of the amount of binder, not the amount of binder itself. Therefore, the elements extracted by SEM-EDX in calculating the binder amount do not have to be all the elements contained in the first binder and the second binder, but it may be at least one element contained in the first binder and at least one element contained in the second binder. When the first binder and the second binder contain a common element, only one kind of element common to both may be extracted.

The interfacial binder ratio can be adjusted by appropriately changing the conditions for forming the insulating layer (including the conditions for applying the insulating layer slurry). The adjustment of the interfacial binder ratio will be described below.

As in the case of sequential applying, when the insulating layer slurry is applied on the dried active material layer, the binder contained in the insulating layer slurry penetrates into the pores of the active material layer which is a porous body. It is considered that if more binder penetrates into the pores of the active material layer slurry until the insulating layer slurry dries, the amount of binder in the interface region decreases, as a result, the interfacial binder ratio becomes small.

As a method of reducing the penetration of the binder of the insulating layer slurry into the pores of the active material layer, two methods can be mainly considered. The first method is a method of applying the insulating layer slurry before the active material layer slurry is dried, that is, simultaneous application. The second method is a method in which a binder layer is provided on the surface of the active material layer to prevent the insulating layer slurry from penetrating into the pores of the active material layer. The insulating layer obtained by the second method is an insulating layer having the above-described first layer containing non-conductive particles and the second layer which is the binder layer.

However, in simultaneous applying, there is a problem that the insulating layer slurry and the active material layer slurry are mixed with each other before drying, so it is important to suppress the mixture of these. In order to suppress the mixing of these, two main methods can be considered. The first method is to increase the solid content ratio of the insulating layer slurry, and the second method is to increase the viscosity of the insulating layer slurry.

Usually, the degree of ease of drying the slurry depends on the amount of solvent in the slurry, and it is considered that the smaller the amount of solvent, the faster the slurry dries. Therefore, by increasing the solid content ratio of the insulating layer slurry and lowering the solvent ratio, the time until the insulating layer slurry dries becomes shorter, and the mixture of the insulating layer slurry and the active material layer slurry can be reduced. When the mass of the filler contained in the slurry (non-conductive particles and the like, in the insulating layer slurry) is Mi, the mass of the binder is Mb, and the mass of the solvent is Ms, the solid content ratio of the slurry is given by (Mi+Mb)/(Mi+Mb+Ms).

In order to further suppress mixing, the solid content ratio of the insulating layer slurry is preferably larger than 50% by mass.

Further, by increasing the viscosity of the insulating layer slurry, mixing can be suppressed. In order to further suppress mixing, the viscosity of the insulating layer slurry is preferably 4000 mPa·s or more. However, if the viscosity is too high, it becomes difficult to form the insulating layer with a uniform thickness and to handle the slurry during applying. Therefore, the viscosity of the insulating layer slurry is preferably 200,000 mPa·s or less in order to secure the uniformity of the thickness of the insulating layer and to secure the good applying property of the insulating layer slurry. Here, the viscosity is a viscosity measured at a shear rate of 1/sec at 25° C.

For reference, examples of cross-sectional SEM images are shown in FIGS. 6A and 6B, which are images of electrodes obtained by simultaneously applying the insulating layer slurry having different solid content ratios and viscosities on the active material layer slurry. FIG. 6A is a cross-sectional SEM image of an electrode obtained by simultaneously applying insulating layer slurry having a solid content ratio of 50% by mass and a viscosity of 20000 mPa·s, and the mixture of the active material layer and the insulating layer is extremely small. FIG. 6B is a cross-sectional SEM image of an electrode obtained by simultaneously applying an insulating layer slurry having a solid content ratio of 33% by mass and a viscosity of 2000 mPa·s, and active material layer and the insulating layer are considerably mixed.

[5] Electrolytic Solution

The electrolytic solution includes, but are not particularly limited, a nonaqueous electrolytic solution which is stable at an operating potential of the battery. Specific examples of the nonaqueous electrolytic solution include nonprotic organic solvent such as cyclic carbonates such as propylene carbonate (PC), ethylene carbonate (EC), fluoroethylene carbonate (FEC), t-difluoroethylene carbonate (t-DFEC), butylene carbonate (BC), vinylene carbonate (VC), vinylethylene carbonate (VEC); chain carbonates such as allylmethyl carbonate (AMC), dimethyl carbonate (DMC), diethyl carbonate (DEC), ethylmethyl carbonate (EMC), dipropyl carbonate (DPC); propylene carbonate derivative; aliphatic carboxylic acid esters such as methyl formate, methyl acetate, ethyl propionate; cyclic esters such as γ-butyrolactone (GBL). The nonaqueous electrolytic solution may be used singly or a mixture of two or more kinds may be used in combination. Furthermore, sulfur-containing cyclic compound such as sulfolane, fluorinated sulfolane, propane sultone or propene sultone may be used.

Specific examples of support salt contained in the electrolytic solution include, but are not particularly limited to, lithium salt such as $LiPF_6$, $LiAsF_6$, $LiAlCl_4$, $LiClO_4$, $LiBF_4$, $LiSbF_6$, $LiCF_3SO_3$, $LiC_4F_9SO_3$, $Li(CF_3SO_2)_2$, $LiN(CF_3SO_2)_2$. The support salt may be used singly or two or more kinds thereof may be used in combination.

[6] Separator

When the battery element 10 includes the separator 13 between the positive electrode 11 and the negative electrode 12, the separator is not particularly limited, and porous film or non-woven fabric made of such as polypropylene, polyethylene, fluorine-based resin, polyamide, polyimide, polyester, polyphenylene sulfide, polyethylene terephthalate, cellulose, as well as an article in which inorganic substance such as silica, alumina, glass is attached or bonded to a base material made of the above material and an article singly processed from the above material as non-woven fabric or cloth may be used as the separator. The thickness of the separator may be arbitrary. However, from the viewpoint of high energy density, a thin separator is preferable and the thickness can be, for example, 10 to 30 μm.

The present invention is not limited to the above described lithium ion secondary battery and can be applied to any battery. However, since the problem of heat often occurs in batteries with high capacity in many cases, the present invention is preferably applied to batteries with high capacity, particularly lithium ion secondary batteries.

Next, embodiments of method for manufacturing the electrode shown in FIG. 3 will be described. In the following description, the positive electrode 11 and the negative electrode 12 will be described as "electrodes" without particularly distinguishing from each other, but the positive electrode 11 and the negative electrode 12 differ only in the materials, shapes, etc. to be used, and the following explanation will be made on the positive electrode 11 and the negative electrode 12.

The electrode finally has a structure in which the active material layer 111 and the insulating layer 112 are laminated in this order on the current collector 110. Such a laminated structure is manufactured by a method including a step of forming the active material layer 111 on the current collector 110 and a step of forming the insulating layer 112 on the active material layer 111. Here, the active material layer 111 contains an active material and a first binder, and the insulating layer 112 contains non-conductive particles and a second binder. Particularly in the present embodiment, in the step of forming the insulating layer, the insulating layer is formed such that the interfacial binder ratio, which is a ratio of amount of the first binder and the second binder existing in an interface region between the active material layer and the insulating layer per unit thickness of the interface region to amount of the first binder and the second binder existing in the active material layer per unit thickness of the active material layer, is 85% or more.

The step of forming the active material layer 111 can include a step of applying an active material layer slurry containing an active material, a first binder and a first solvent, and a step of drying the applied active material layer slurry. The step of forming the insulating layer 112 can include a step of applying an insulating layer slurry containing non-conductive particles, a second binder and a second solvent, and a step of drying the applied insulating layer slurry. Preferably, the step of applying the active material layer slurry and the step of applying the insulating layer slurry are performed in this order, and the step of drying active material layer slurry and the step of drying insulating layer slurry are simultaneously performed. Accordingly, the insulating layer slurry is applied onto the active material layer slurry before the active material slurry is dried, and then both are dried, so that the step of forming the active material layer 111 and the step of forming the insulating layer 112 can be performed simultaneously.

From the viewpoint of the adhesion between the active material layer and the insulating layer, it is preferable that the active material layer slurry and the insulating layer slurry have the same main component of the binder, the same main component of the solvent or the same main component of both. When at least one of the main component of the binder and the main component of the solvent of the active material layer slurry and the insulating layer slurry is the same, the adhesion between the active material layer and the insulating layer is improved.

For manufacturing the electrode, for example, the manufacturing apparatus shown in FIG. 7 can be used. The manufacturing apparatus shown in FIG. 7 includes a backup roller 201, a die coater 210 and a drying machine 203.

The backup roller 201 rotates in a state in which the long current collector 110 is wound on the outer peripheral surface of the backup roller 201 whereby the current collector 110 is fed in the rotation direction of the backup roller 201 while the rear surface of the current collector 110 is supported. The die coater 210 has a first die head 211 and a second die head 212 which are spaced from each other in the radial direction and the circumferential direction of the backup roller 201 with respect to the outer circumferential surface of the backup roller 201.

The first die head 211 is for applying the active material layer 111 on the surface of the current collector 110 and is located on the upstream side of the second die head 212 with respect to the feed direction of the current collector 110. A discharge opening 211a having a width corresponding to the applying width of the active material layer 111 is opened at the tip of the first die head 211 facing the backup roller 201. The active material layer slurry is discharged from the discharger opening 211a. The active material layer slurry is prepared by dispersing particles of an active material and a binder (binding agent) in a solvent, and is supplied to the first die head 211.

The second die head 212 is for applying the insulating layer 112 on the surface of the active material layer 111 and is located on the downstream side of the first die head 211 with respect to the feed direction of the current collector 110. A discharge opening 212a having a width corresponding to the applying width of the insulating layer 112 is opened at the tip of the second die head 212 facing the backup roller 201. The insulating layer slurry is discharged from the discharge opening 212a. The insulating layer slurry is prepared by dispersing non-conductive particles and a binder (binding agent) in a solvent, and is supplied to the second die head 212.

A solvent is used for preparing the active material layer slurry and the insulating layer slurry. When N-methyl-2-pyrrolidone (NMP) is used as the solvent, peeling strength of the layer obtained by evaporating the solvent can be increased compared with the case of using an aqueous solvent. When N-methyl-2-pyrrolidone was used as a solvent, the solvent did not evaporate completely even if the solvent was evaporated in a subsequent step, and the obtained layer contains a slight amount of N-methyl-2-pyrrolidone.

The drying machine 203 is for evaporating the solvent from the active material layer slurry and the insulating layer slurry respectively discharged from the first die head 211 and the second die head 212. The slurries are dried by the evaporation of the solvent, whereby the active material layer 111 and an insulating layer 112 are formed.

Next, a manufacturing process of the electrode by means of the manufacturing apparatus shown in FIG. 7 will be described. For convenience of explanation, the active material layer slurry and the active material layer obtained therefrom are described as "active material layer 111" without distinguishing between them. Actually, the "active material layer 111" before drying means the active material layer slurry. Similarly, the "insulating layer 112" before drying means the insulating layer slurry.

First, the active material layer 111 slurried with a solvent is intermittently applied to the surface of the long current collector 110 supported and fed on the backup roller 201 by using the first die head 211. As a result, a slurry of the active material layer 111 is applied to the current collector 110 at intervals in the feeding direction A of the current collector 110. By intermittently applying the active material layer 111 with the first die head 211, the active material layer 111 is applied in a rectangular shape having a longitudinal length parallel to the feeding direction of the current collector 110 and a lateral length along a direction orthogonal thereto.

Next, when the leading end of the applied active material layer 111 in the feeding direction of the current collector 110 is fed to a position facing the discharge opening 212a of the second die head 212, the insulating layer 112 slurried with solvent is intermittently applied to the active material layer 111 by using the second die head 212. The insulating layer 112 is applied before the active material layer 111 is dried, that is, before the solvent of the active material layer 111 is evaporated. By intermittently applying the insulating layer 112 with the second die head 212, the insulating layer 112 is applied in a rectangular shape having a longitudinal length parallel to the feeding direction of the current collector 110 and a lateral length along a direction perpendicular thereto.

In the present embodiment, the first die head 211 and the second die head 212 have the same width (the dimension in the direction orthogonal to the feeding direction of the current collector 110) of the discharge openings 211a and 212a, and the active material layer 111 and the insulating layer 112 have the same applying width.

After applying the active material layer 111 and the insulating layer 112, the current collector 110 is fed to the drying machine 203, the solvents of the active material layer slurry and the insulating layer slurry are evaporated in the drying machine 203. Thus, the flurry for the active material layer and the insulating layer slurry are dried. After evaporation of the solvent, the current collector 110 is fed to a roll press where the active material layer 111 and the insulating layer 112 are compression-molded. Thus, the active material layer 111 is formed simultaneously with the formation of the insulating layer 112.

Finally, the current collector 110 is cut into a desired shape by an appropriate method such as punching. The electrode is thereby obtained. The cutting step may be carried out so as to obtain a desired shape by one time of processing or it may be carried out so as to obtain a desired shape by a plurality of times of processing.

Although the present invention has been described with reference to one embodiment, the present invention is not limited to the above-described embodiments, and can be arbitrarily changed within the scope of the technical idea of the present invention.

For example, in the above embodiment, in order to apply the active material layer 111 and the insulating layer 112, a die coater 210 having two die heads 211 and 212 with discharge openings 211a and 212a as shown in FIG. 7 was used. However, as shown in FIG. 7A, the active material layer 111 and the insulating layer 112 can be applied to the current collector 110 by using a die coater 220 having a single die head 221 with two discharge openings 221a and 221b.

The two discharge openings 221a and 221b are arranged at intervals in the rotation direction of the backup roller 201, that is, the feed direction of the current collector 110. The active material layer slurry is applied by the discharge opening 221a located on the upstream side in the feed direction of the current collector 110 and the insulating layer slurry is applied by the discharge opening 221b located on the downstream side. Therefore, the active material layer slurry and the insulating layer slurry are discharged respectively from the two discharge openings 221a and 221b, thereby it is possible to obtain a structure that the active material layer 111 is intermittently applied to the surface of the current collector 110 and the insulating layer 112 is applied to the surface of the active material layer 111.

As still another embodiment of the die coater, a die coater 220 shown in FIG. 7B can also be used. The die coater 220 shown in FIG. 7B has a first backup roller 201a and a second backup roller 201b, and a first die head 231 and a second die head 232 are arranged corresponding to each of them. The active material layer 111 is applied by the first die head 231 located on the upstream side of the transport direction of the current collector 110, and the insulating layer 112 is applied by the second die head 232 located on the downstream side. Even with such a configuration, it can be obtained a structure in which the active material layer 111 is intermittently applied to the surface of the current collector 110 and the insulating layer 112 is applied to the surface of the active material layer 111.

When the die coater 220 having a plurality of backup rollers 201a and 201b as shown in FIG. 7B is used, it can be arranged a first sensor 240a located upstream of the first backup roller 201a, a second sensor 240b between the first backup roller 201a and the second backup roller 201b and a third sensor 240c located downstream of the second backup roller 201b. These sensors 240a, 240b, and 240c can be film thickness meters, for example, and thereby the thickness of the active material layer 111 and the thickness of the insulating layer 112 can be measured. The thickness of the active material layer 111 can be obtained from the difference between the measurement result by the second sensor 240b and the measurement result by the first sensor 240a, and the thickness of the insulating layer 112 can be obtained from the difference between the measurement result obtained by the third sensor 240c and the measurement result obtained by the second sensor 240b.

As the film thickness meter, a known film thickness meter such as a radiation ($\alpha$-ray, $\gamma$-ray, X-ray) film thickness meter and a laser film thickness meter can be used. The film thickness meter is desirably a non-contact type. In addition, either a reflection type or a transmission type can be used as the film thickness meter.

Furthermore, in the above embodiment, the case where the active material layer 111 and the insulating layer 112 are applied to one side of the current collector 110 has been described. However, it is possible to manufacture an electrode having the active material layer 111 and the insulating layer 112 on both surface of the current collector 110 by applying the active material layer 111 and the insulating layer 112 on the other side of the current collector 110 in a similar manner. After the active material layer 111 and the insulating layer 112 are formed on both surfaces of the current collector 110, the current collector 110 is fed to a roll press machine, where the active material layer 111 and the insulating layer 112 are compressed.

In the above embodiment, the case where the first layer is the active material layer and the second layer is the insulating layer has been described for the electrode and the manufacturing method thereof. However, the combination of the first layer and the second layer is not limited.

For example, the first layer can be a high adhesion active material layer in which the amount of the binder is increased than usual, and the second layer can be a high energy density active material layer. With such a layer structure, it is possible to improve the energy density of the battery while suppressing the falling off of the active material layer from the current collector. When the first layer is a low-resistance active material layer in which the amount of the conductive material is increased than usual, or a conductive layer made of a conductive material and a binder, and the second layer is a high energy density active material layer, both the energy density and the charge/discharge output density of the battery can be improved.

Further, the battery obtained by the present invention can be used in various uses. Some examples are described below.

[Battery Pack]

A plurality of batteries can be combined to form a battery pack. For example, the battery pack may have a configuration in which two or more batteries according to the present embodiment are connected in series and/or in parallel. The series number and parallel number of the batteries can be appropriately selected according to the intended voltage and capacity of the battery pack.

[Vehicle]

The above-described battery or the battery pack thereof can be used for a vehicle. Examples of vehicles that can use batteries or assembled batteries include hybrid vehicles, fuel cell vehicles, and electric vehicles (four-wheel vehicles (commercial vehicles such as passenger cars, trucks and buses, and mini-vehicles, etc.), motorcycles (motorbike and tricycles). Note that the vehicle according to the present embodiment is not limited to an automobile, and the battery can also be used as various power sources for other vehicles, for example, transportations such as electric trains. As an example of such a vehicle, FIG. 8 shows a schematic diagram of an electric vehicle. The electric vehicle 300 shown in FIG. 8 has a battery pack 310 configured to satisfy the required voltage and capacity by connecting a plurality of the above-described batteries in series and in parallel.

[Power Storage Device]

The above-described battery or the battery pack thereof can be used for a power storage device. Examples of the power storage device using the secondary battery or the battery pack thereof include a power storage device which is connected between a commercial power supply supplied to an ordinary household and a load such as a household electric appliance to use as a backup power source or an auxiliary power source in case of power outage, and a power storage device used for large-scale electric power storage for stabilizing electric power output with large time variation due to renewable energy such as photovoltaic power generation. An example of such a power storage device is schematically shown in FIG. 9. The power storage device 301 shown in FIG. 9 has a battery pack 311 configured to satisfy a required voltage and capacity by connecting a plurality of the above-described batteries in series and in parallel.

[Others]

Furthermore, the above-described battery or the battery pack thereof can be used as a power source of a mobile device such as a mobile phone, a notebook computer and the like.

Experimental Examples

<Preparation of Positive Electrode Active Material Layer Slurry>

Lithium nickel composite oxide ($LiNi_{0.80}Mn_{0.15}Co_{0.05}O_2$) as a positive electrode active material, carbon black as a conductive auxiliary, and polyvinylidene fluoride (PVdF) as a binder (first binder) were weighed at a mass ratio of 90:5:5, and they were kneaded using N-methyl pyrrolidone as a solvent to obtain positive electrode active material layer slurries.

<Preparation of Insulating Layer Slurry>

Alumina (AKP-3000 manufactured by Sumitomo Chemical Co., Ltd.) as non-conductive particles and polyvinylidene fluoride (PVdF) as a binder (second binder) are weighed at a predetermined mass ratio, and these were kneaded using N-methylpyrrolidone as a solvent to obtain an insulating layer slurry.

<Preparation of Binder Slurry>

Polyvinylidene fluoride (PVdF) as a binder (second binder) was dissolved using N-methylpyrrolidone as a solvent to prepare a binder slurry. The binder concentration in the binder slurry was 10 wt %.

<Preparation of Positive Electrode>

An aluminum foil having a thickness of 20 μm was prepared as a current collector. The positive electrode active material layer slurry is applied on the aluminum foil, and the insulating layer slurry is applied on the positive electrode active material layer slurry before the positive electrode active material layer slurry is dried. A one-roll two-head type die coater having two die heads for one backup roll was used for applying the positive electrode active material layer slurry and the insulating layer slurry. The applied positive electrode active material slurry and insulating layer slurry were dried and pressed to prepare a positive electrode.

Here, 2-4 positive electrodes were prepared for each of 2 types of positive electrodes (Experimental Examples 1, 2) in which the binder concentration of the insulating layer slurry and the manufacturing process were changed. The binder concentration is given by Mb/(Mi+Mb), where Mi is the mass of the non-conductive particles contained in the insulating layer slurry and Mb is the mass of the binder. In addition, as Experimental Example 3, two positive electrodes were prepared in which the applying conditions of the positive electrode active material layer slurry and the insulating layer slurry were changed and a binder layer was formed between the two layers. In Experimental Example 3, the applied positive electrode active material slurry was dried, then the binder slurry was applied and dried, and the insulating layer slurry was further applied and dried thereon, and finally the whole was pressed to prepare the positive electrodes. Further, in Experimental Example 3, the binder slurry was applied such that the thickness after drying was 1.5 μm. As Comparative Example 1, two positive electrodes having different coating conditions for the positive electrode active material slurry and the insulating layer slurry were prepared. In Comparative Example 1, the applied positive electrode active material slurry was dried, then the insulating layer slurry was applied and dried, and finally the whole was pressed to produce the positive electrodes.

<Evaluation>

The interfacial binder ratios were determined for the produced Experimental Examples 1-3 and Comparative Example 1. The interfacial binder ratios were determined by the cross-section SEM-EDX described above. However, since polyvinylidene fluoride was used for both the first binder and the second binder, only fluorine was extracted by EDX, and the interfacial binder ratios were determined from the amount of fluorine. Further, a tape peeling test was performed on the manufactured Experimental Examples 1-3 and Comparative Example 1 to evaluate an adhesion of the insulating layer. The tape peeling test was performed as follows.

In the prepared positive electrode, an electrode in a state before pressure molding was prepared, and the tape peeling test was performed to calculate a peeled amount. In the tape peeling test, adhesive cellophane tape was cut into 20 mm×30 mm, a region of 20 mm×20 mm was adhered to the electrode, and the adhered surface was fixed by pressing with a finger. An area of 20 mm×10 mm that was not adhered to the electrodes was used as a picking margin when the tape was peeled off. The tape was peeled off with a picking margin, and the peeling mount of the insulating layer was measured. When the tape was peeled off, the part where the active material layer could be visually confirmed was judged as the part where the insulating layer was peeled off, and the area of the part where the insulating layer was peeled off was divided by the adhesive area of the tape (20 mm×20 mm) to calculate the peeling amount (%).

Table 1 shows main manufacturing conditions, interfacial binder ratios, and peel test results of Experimental Examples 1 to 3 and Comparative Example 1. In addition, since 2 to 4 of each of the Experimental Examples and Comparative Example were prepared, they are distinguished by branch numbers in Table 1.

TABLE 1

| | Slurry Applying Method | Insulating Layer Binder Concentration (%) | Interfacial Binder Ratio (%) | Peeling Amount (%) |
|---|---|---|---|---|
| Experimental Example 1-1 | Simultaneous | 3 | 115 | 1.2 |
| Experimental Example 1-2 | ↑ | ↑ | 90 | 1.2 |
| Experimental Example 2-1 | Simultaneous | 5 | 127 | 0 |
| Experimental Example 2-2 | ↑ | ↑ | 115 | 0 |
| Experimental Example 2-3 | Simultaneous | 5 | 100 | 0.5 |
| Experimental Example 2-4 | ↑ | ↑ | 133 | 0.5 |
| Experimental Example 3-1 | Sequential | 3 | 120 | 0.3 |
| Experimental Example 3-2 | ↑ | ↑ | 128 | 0 |
| Comparative Example 1-1 | Sequential | 3 | 71 | 15 |
| Comparative Example 1-2 | ↑ | ↑ | 67 | 15 |

In addition, a graph showing the relationship between the interfacial binder ratio and the peeling amount obtained in Experimental Examples 1 to 3 and Comparative Example 1 is shown in FIG. 10. The graph shown in FIG. 10 is a graph obtained by approximating the results obtained in Experimental Examples 1 to 3 and Comparative Example 1 with a cubic polynomial approximation curve.

The following can be said from Table 1 and FIG. 10.

The peeling amount depends on the interfacial binder ratio, and when the interfacial binder ratio is high, the peeling amount decreases. Particularly, when the interface binder ratio is 85% or more, the peeling amount is extremely small. The small peeling amount means that the adhesion of the insulating layer to the active material layer is high. Therefore, by setting the interface binder ratio to 85% or more, high adhesion of the insulating layer to the active material layer can be ensured, whereby a short circuit between the active material layer and the insulating layer due to peeling of the insulating layer from the active material layer can be suppressed.

The present invention has been described in detail above. The present specification discloses the inventions described in the following further exemplary embodiments. However, the disclosure of the present specification is not limited to the following further exemplary embodiments.

Further Exemplary Embodiment 1

An electrode used as a positive electrode and a negative electrode of a secondary battery comprising:
a current collector,
an active material layer formed on at least one surface of the current collector and containing an active material and a first binder, and
an insulating layer formed on a surface of the active material layer and containing non-conductive particles and a second binder,
wherein an interfacial binder ratio, which is a ratio of amount of a binder existing in an interface region between the active material layer and the insulating layer per unit thickness of the interface region to amount of a binder existing in the active material layer per unit thickness of the active material layer, is 85% or more.

Further Exemplary Embodiment 2

The electrode according to Further exemplary embodiment 1, wherein the first binder and the second binder contain the same element.

Further Exemplary Embodiment 3

The electrode according to Further exemplary embodiment 2, wherein the first binder and the second binder are the same binder.

Further Exemplary Embodiment 4

The electrode according to Further exemplary embodiment 2 or 3, wherein the first binder and the second binder contain fluorine.

Further Exemplary Embodiment 5

The electrode according to Further exemplary embodiment 4, wherein the first binder and the second binder are polyvinylidene fluoride.

Further Exemplary Embodiment 6

The electrode according to anyone of Further exemplary embodiments 1 to 5, wherein the insulating layer has a first layer containing the non-conductive particles and a second layer not containing the non-conductive particles, and the second layer is provided between the active material layer and the first layer.

Further Exemplary Embodiment 7

A secondary battery having the electrode according to any one of Further exemplary embodiments 1 to 6 as a positive electrode and a negative electrode, comprising:
at least one positive electrode,
at least one negative electrode,
an electrolytic solution, and
a casing enclosing the positive electrode and the negative electrode together with the electrolytic solution.

Further Exemplary Embodiment 8

A method for manufacturing an electrode used as a positive electrode and a negative electrode of a secondary battery, the method comprising steps of:

forming an active material layer containing an active material and a first binder, and forming an insulating layer containing non-conductive particles and a second binder, wherein the step of forming the insulating layer forms the insulating layer such that an interfacial binder ratio, which is a ratio of amount of a binder existing in an interface region between the active material layer and the insulating layer per unit thickness of the interface region to amount of a binder existing in the active material layer per unit thickness of the active material layer, is 85% or more.

Further Exemplary Embodiment 9

The method for manufacturing the electrode according to Further exemplary embodiment 8, wherein the step of forming the active material layer includes the steps of:

applying an active material layer slurry containing the active material, the first binder and a first solvent, and drying the active material layer slurry which was coated, and wherein the step of forming the insulating layer includes the steps of:

applying an insulating layer slurry including the non-conductive particles, the second binder and a second solvent, and drying the insulating layer slurry which was applied.

Further Exemplary Embodiment 10

The method for manufacturing the electrode according to Further exemplary embodiment 9 wherein the step of applying the active material layer and the step of applying the insulating layer slurry are performed in this order, and wherein the step of drying the active material layer slurry and the step of drying the insulating layer slurry are performed at the same time, whereby the step of forming the active material layer and the step of forming the insulating layer are performed simultaneously.

Further Exemplary Embodiment 11

The method for manufacturing the electrode according to any of Further exemplary embodiments 8 to 10, wherein the first binder and the second binder contain the same element.

Further Exemplary Embodiment 12

The method for manufacturing the electrode according to Further exemplary embodiment 11, wherein the first binder and the second binder are the same binder.

Further Exemplary Embodiment 13

The method for manufacturing the electrode according to Further exemplary embodiment 11 or 12, wherein the first binder and the second binder contain fluorine.

Further Exemplary Embodiment 14

The method for manufacturing an electrode according to Further exemplary embodiment 13, wherein the first binder and the second binder are polyvinylidene fluoride.

Further Exemplary Embodiment 15

A method for manufacturing a second battery, the method comprising steps of:

manufacturing a positive electrode and a negative electrode by the method for manufacturing according to any of Further exemplary embodiments 8 to 14, arranging the positive electrode and the negative electrode so as to face each other to form a battery element, and enclosing the battery element with an electrolytic solution in a casing.

Although the present invention has been described with reference to the exemplary embodiments and examples, the present invention is not limited to the above-described exemplary embodiments and examples. Various modifications that can be understood by those skilled in the art can be added to the configuration and details of the present invention within the scope of the present invention.

INDUSTRIAL APPLICABILITY

The battery according to the present invention can be utilized in, for example, any industrial field where a power source is required and industrial field relating to the transport, storage, and supply of electrical energy. Specifically, it can be utilized for power sources of mobile devices such as cell phones and notebook computers; power sources of movement/transport media such as trains, satellites, and submarines, including electric vehicles such as electric automobiles, hybrid cars, electric motorcycles, and electrically assisted bicycles; backup power sources such as UPSs; power storage facilities that store electric power produced by solar power production, wind power production, and the like; etc.

EXPLANATION OF SYMBOLS

10 Battery element
10a Positive electrode tab
10b Negative electrode tab
11 Positive electrode
12 Negative electrode
13 Separator
21, 22 Casing member
31 Positive electrode terminal
32 Negative electrode terminal
110 Current collector
110a Extended portion
111 Active material layer
112 Insulating layer

The invention claimed is:

1. An electrode used as a positive electrode and a negative electrode of a secondary battery comprising:
a current collector,
an active material layer formed on at least one surface of the current collector and containing an active material and a first binder, and
an insulating layer formed on a surface of the active material layer and containing non-conductive particles and a second binder, wherein an interfacial binder ratio, which is a ratio of amount of a binder existing in an interface region between the active material layer and the insulating layer per unit thickness of the interface region to amount of a binder existing in the active material layer per unit thickness of the active material layer, is 85% or more, wherein the interface region is a region having a range of 6 μm in the thickness direction with an interface BS as the center, the interface BS is the interface between the active material layer and the insulating layer determined from a scanning electron microscope image of a cross section of the electrode, wherein the interfacial binder ratio is given by Bt2/Bt1, where Bt1 is the mass of the first and second binders per unit thickness of the active material layer and Bt2 is the mass of the first and second binders per unit thickness of the interfacial region in the interfacial region, and a ratio of the non-conductive particles in the insulating layer is 70 mass % or more.

2. The electrode according to claim 1, wherein the first binder and the second binder contain the same element.

3. The electrode according to claim 2, wherein the first binder and the second binder are the same binder.

4. The electrode according to claim 2, wherein the first binder and the second binder contain fluorine.

5. The electrode according to claim 4, wherein the first binder and the second binder are polyvinylidene fluoride.

6. The electrode according to claim 1, wherein the insulating layer has a first layer containing the non-conductive particles and a second layer not containing the non-conductive particles, and the second layer is provided between the active material layer and the first layer.

7. A secondary battery having the electrode according to claim 1 as a positive electrode and a negative electrode, comprising:
    at least one positive electrode,
    at least one negative electrode,
    an electrolytic solution, and
    a casing enclosing the positive electrode and the negative electrode together with the electrolytic solution.

8. A method for manufacturing an electrode used as a positive electrode and a negative electrode of a secondary battery, the method comprising steps of:
    forming an active material layer containing an active material and a first binder, and
    forming an insulating layer containing non-conductive particles and a second binder,
    wherein the step of forming the insulating layer forms the insulating layer such that an interfacial binder ratio, which is a ratio of amount of a binder existing in an interface region between the active material layer and the insulating layer per unit thickness of the interface region to amount of a binder existing in the active material layer per unit thickness of the active material layer, is 85% or more,
    wherein the interface region is a region having a range of 6 μm in the thickness direction with an interface BS as the center, the interface BS is the interface between the active material layer and the insulating layer determined from a scanning electron microscope image of a cross section of the electrode,
    wherein the interfacial binder ratio is given by Bt2/Bt1, where Bt1 is the mass of the first and second binders per unit thickness of the active material layer and Bt2 is the mass of the first and second binders per unit thickness of the interfacial region in the interfacial region, and
    a ratio of the non-conductive particles in the insulating layer is 70 mass % or more.

9. The method for manufacturing the electrode according to claim 8, wherein the step of forming the active material layer includes the steps of:
    applying an active material layer slurry containing the active material, the first binder and a first solvent, and
    drying the active material layer slurry which was coated, and
    wherein the step of forming the insulating layer includes the steps of:
    applying an insulating layer slurry including the non-conductive particles, the second binder and a second solvent, and
    drying the insulating layer slurry which was applied.

10. The method for manufacturing the electrode according to claim 9, wherein the step of applying the active material layer and the step of applying the insulating layer slurry are performed in this order, and
    wherein the step of drying the active material layer slurry and the step of drying the insulating layer slurry are performed at the same time, whereby the step of forming the active material layer and the step of forming the insulating layer are performed simultaneously.

11. The method for manufacturing the electrode according to claim 8, wherein the first binder and the second binder contain the same element.

12. The method for manufacturing the electrode according to claim 11, wherein the first binder and the second binder are the same binder.

13. The method for manufacturing the electrode according to claim 11, wherein the first binder and the second binder contain fluorine.

14. The method for manufacturing an electrode according to claim 13, wherein the first binder and the second binder are polyvinylidene fluoride.

15. A method for manufacturing a second battery, the method comprising steps of:
    manufacturing a positive electrode and a negative electrode by the method for manufacturing according to claim 8,
    arranging the positive electrode and the negative electrode so as to face each other to form a battery element, and
    enclosing the battery element with an electrolytic solution in a casing.

* * * * *